US011294596B2

(12) United States Patent
Ji

(10) Patent No.: US 11,294,596 B2
(45) Date of Patent: Apr. 5, 2022

(54) MEMORY CONTROLLER AND OPERATING METHOD THEREOF

(71) Applicant: SK hynix Inc., Gyeonggi-do (KR)

(72) Inventor: Seung Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 16/727,396

(22) Filed: Dec. 26, 2019

(65) Prior Publication Data

US 2021/0064285 A1 Mar. 4, 2021

(30) Foreign Application Priority Data

Sep. 4, 2019 (KR) .......................... 10-2019-0109715

(51) Int. Cl.
*G06F 3/06* (2006.01)
*G06F 9/30* (2018.01)

(52) U.S. Cl.
CPC .......... *G06F 3/0659* (2013.01); *G06F 3/0604* (2013.01); *G06F 3/0673* (2013.01); *G06F 9/3004* (2013.01)

(58) Field of Classification Search
None
See application file for complete search history.

(56) References Cited

U.S. PATENT DOCUMENTS

| 6,421,757 | B1 * | 7/2002 | Wang | G11C 16/10 |
| | | | | 365/185.22 |
| 2010/0238725 | A1 * | 9/2010 | Naruke | G11C 11/5628 |
| | | | | 365/185.03 |
| 2016/0098319 | A1 * | 4/2016 | Gorobets | G11C 16/10 |
| | | | | 714/773 |
| 2018/0314444 | A1 * | 11/2018 | Jinzenji | G06F 3/0679 |
| 2019/0235787 | A1 * | 8/2019 | Kanno | G06F 3/0656 |
| 2019/0311772 | A1 * | 10/2019 | Diep | G11C 16/14 |

FOREIGN PATENT DOCUMENTS

| KR | 10-2015-0136197 | 12/2015 |
| KR | 10-2016-0094764 | 8/2016 |

* cited by examiner

*Primary Examiner* — Elias Mamo
(74) *Attorney, Agent, or Firm* — IP & T Group LLP

(57) ABSTRACT

A memory controller capable of controlling a memory device to perform a fine program operation, based on a time elapsing from a foggy program completion time and a position of a page on which a fine program is performed controls the memory device including a plurality of pages. The memory controller includes: a fine program timer for recording a foggy program completion time at which a foggy program completion response corresponding to a foggy program operation is received from the memory device, and outputting dummy program instruction information, based on an elapsing amount of time from the foggy program completion time; and a command controller for outputting a fine program command, based on the dummy program instruction information.

20 Claims, 20 Drawing Sheets

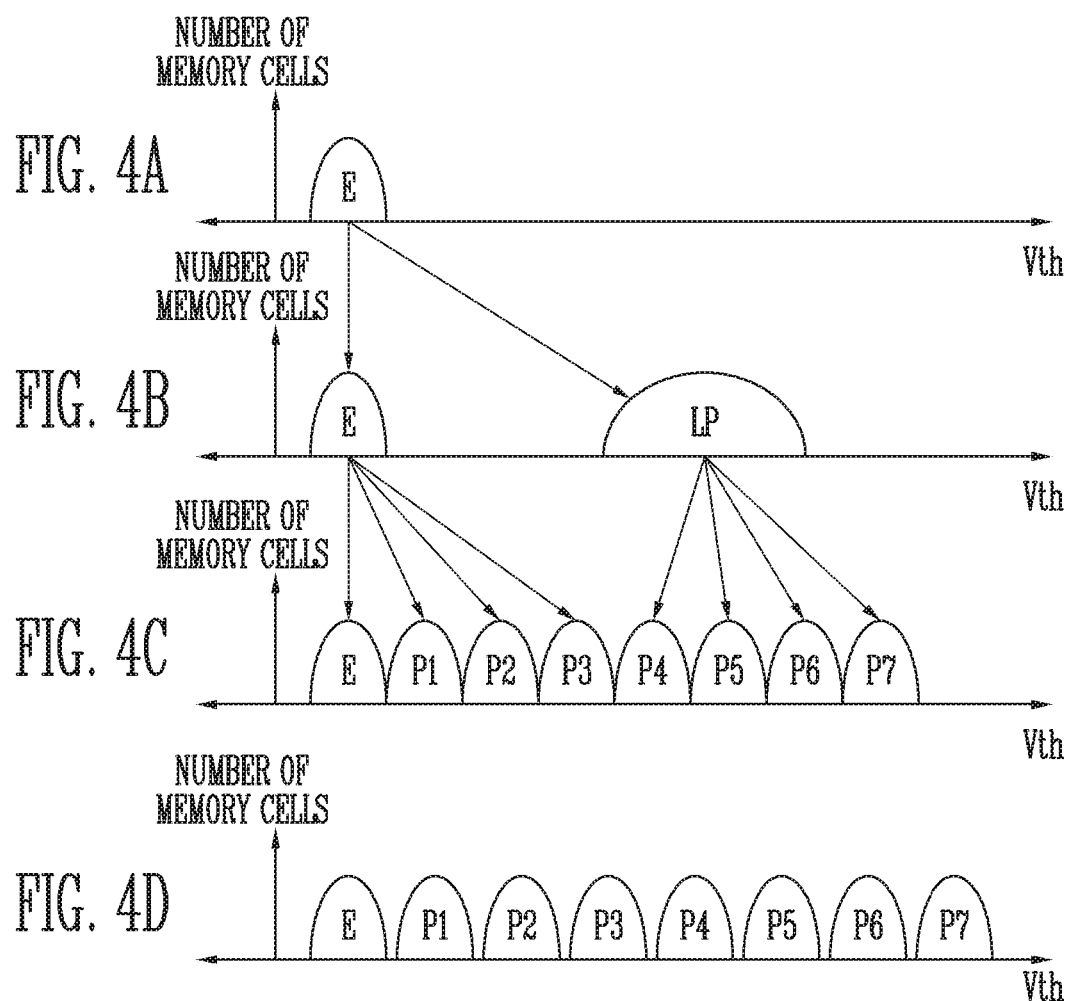

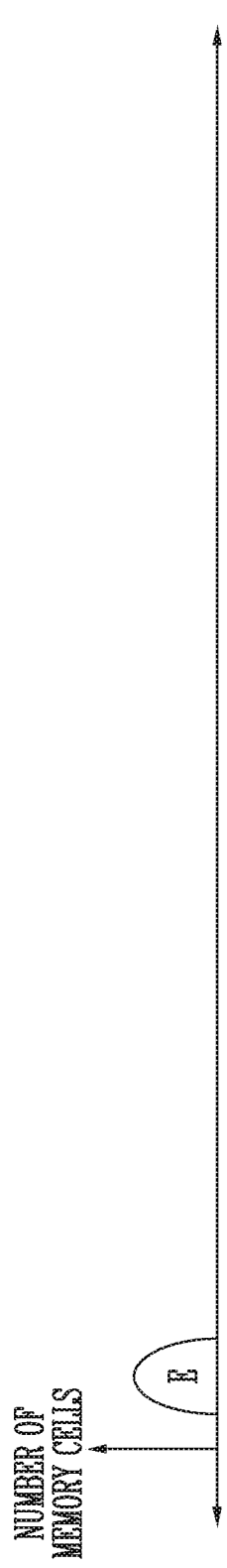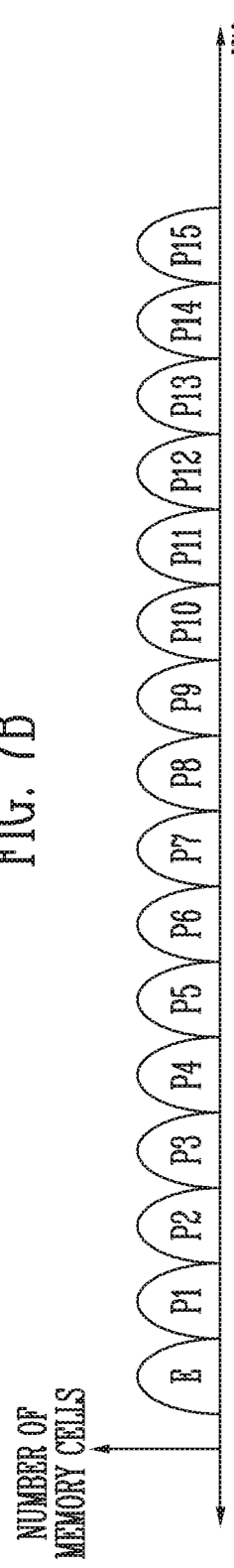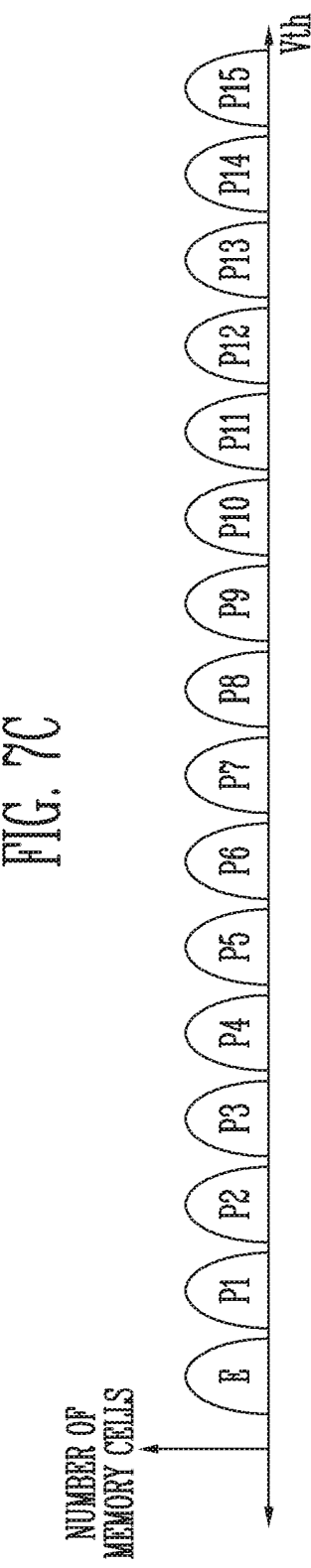

FIG. 9

|  |  | Foggy Program | Fine Program |
|---|---|---|---|
| WL1 | PAGE1 | 1 | 6 |
|  | PAGE2 | 2 | 8 |
|  | PAGE3 | 3 | 10 |
|  | PAGE4 | 4 | 12 |
| WL2 | PAGE5 | 5 | 14 |
|  | PAGE6 | 7 | 16 |
|  | PAGE7 | 9 | 18 |
|  | PAGE8 | 11 | 20 |
| WL3 | PAGE9 | 13 | – |
|  | PAGE10 | 15 | – |
|  | PAGE11 | 17 | – |
|  | PAGE12 | 19 | – |

FIG. 12

|  |  | Foggy Program | Fine Program |
|---|---|---|---|
| WL1 | PAGE1 | 1 | 6 |
|  | PAGE2 | 2 | 8 |
|  | PAGE3 | 3 | 10 |
|  | PAGE4 | 4 | 12 |
| WL2 | PAGE5 | 5 | 14 |
|  | PAGE6 | 7 (Dummy Program) | – |
|  | PAGE7 | 9 (Dummy Program) | – |
|  | PAGE8 | 11 (Dummy Program) | – |
| WL3 | PAGE9 | 13 (Dummy Program) | – |
|  | PAGE10 | 15 | – |
|  | PAGE11 | 16 | – |
|  | PAGE12 | 17 | – |

FIG. 13

| | | Foggy Program | Fine Program |
|---|---|---|---|
| WL1 | PAGE1 | 1 | 6 |
| | PAGE2 | 2 | 8 |
| | PAGE3 | 3 | 10 |
| | PAGE4 | 4 | 12 |
| WL2 | PAGE5 | 5 | 14 |
| | PAGE6 | 7 (Dummy Program) | – |
| | PAGE7 | 9 (Dummy Program) | – |
| | PAGE8 | 11 | 18 |
| WL3 | PAGE9 | 13 (Dummy Program) | – |
| | PAGE10 | 15 (Dummy Program) | – |
| | PAGE11 | 16 (Dummy Program) | – |
| | PAGE12 | 17 (Dummy Program) | – |

FIG. 14

|  |  | Foggy Program | Fine Program |
|---|---|---|---|
| WL1 | PAGE1 | 1 | 5 |
| | PAGE2 | 2 | 6 |
| | PAGE3 | 3 | 7 |
| | PAGE4 | 4 | 8 |
| WL2 | PAGE5 | – | – |
| | PAGE6 | – | – |
| | PAGE7 | – | – |
| | PAGE8 | – | – |
| WL3 | PAGE9 | 9 | 12 |
| | PAGE10 | 10 | 13 |
| | PAGE11 | 11 | 14 |
| | PAGE12 | – | – | ic device, and more particularly, to a memory controller and an
MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0109715, filed on Sep. 4, 2019, which is incorporated herein by reference in its entirety.

BACKGROUND

Field of Invention

The present disclosure generally relates to an electronic device, and more particularly, to a memory controller and an operating method thereof.

Description of Related Art

A storage device is configured to store data under the control of a host such as a computer, a smart phone or a smart pad. The storage device may of the type that stores data on a magnetic disk, such as a Hard Disk Drive (HDD), or of the type that stores data on a semiconductor memory, i.e., a nonvolatile memory, such as a Solid State Drive (SSD) or a memory card.

The storage device may include a memory device configured to store data and a memory controller configured to control the memory device. The memory device may be a volatile memory device or a nonvolatile memory device. Examples of a nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), a Ferroelectric RAM (FRAM), and the like.

SUMMARY

Embodiments provide a memory controller capable of controlling a memory device to perform a fine program operation, based on a time elapsing from a foggy program completion time and a position of a page on which a fine program is performed, and an operating method of the memory controller.

In accordance with an aspect of the present disclosure, there is provided a memory controller for controlling a memory device to perform a foggy-fine program operation on a plurality of pages, the memory controller including: a fine program timer configured to record a foggy program completion time at which a foggy program completion response corresponding to a foggy program operation is received from the memory device, and output dummy program instruction information, based on an elapsing amount of time from the foggy program completion time; and a command controller configured to output a fine program command, based on the dummy program instruction information.

In accordance with another aspect of the present disclosure, there is provided a method for operating a memory controller for controlling a memory device to perform a foggy-fine program operation on a plurality of pages, the method including: recording a foggy program completion time at which a foggy program completion response corresponding to a foggy program operation is received from the memory device; outputting dummy program instruction information, based on an elapsing amount of time from the foggy program completion time; and outputting a fine program command, based on the dummy program instruction information.

In accordance with another aspect of the represent disclosure, there is provided a method for operating a memory controller for controlling a memory device, the method including: controlling the memory device to perform one or more foggy program operations respectively on one or more erased pages included therein; controlling the memory device to perform one or more fine program operations respectively on one or more foggy-programmed pages each having neighboring pages substantially free of interference; and controlling the memory device to perform one or more dummy program operations respectively on one or more erased pages neighboring the foggy-programmed pages while a completion response on one among the foggy program operations is not provided from the memory device over a threshold amount of time.

BRIEF DESCRIPTION OF THE DRAWINGS

Various embodiments are described more fully below with reference to the accompanying drawings; however, the present invention may be embodied in different forms and should not be construed as limited to the embodiments set forth herein. Rather, these embodiments are provided so that this disclosure is thorough and complete and fully convey the scope of the embodiments to those skilled in the art.

In the drawing figures, dimensions may be exaggerated for clarity of illustration. Like reference numerals refer to like elements throughout. Throughout the specification, reference to "an embodiment," "another embodiment" or the like is not necessarily to only one embodiment, and different references to any such phrase are not necessarily to the same embodiment(s).

FIGS. 4A to 4D are diagrams illustrating an embodiment of a foggy-fine program.

FIGS. 7A to 7C are diagrams illustrating a foggy-fine program when the memory device performs a program operation by using a quadruple level cell scheme.

FIG. 9 is a diagram illustrating a foggy-fine program operation sequence.

FIG. 12 is a diagram illustrating a foggy-fine program operation sequence when a dummy program operation is performed.

FIG. 13 is a diagram illustrating a foggy-fine program operation sequence when a foggy program operation is performed after a dummy program operation is performed.

FIG. 14 is a diagram illustrating a foggy-fine program operation sequence when the dummy program operation is not performed.

DETAILED DESCRIPTION

Various embodiments of the present disclosure are described in detail below with reference to the accompanying drawings to enable those skilled in the art to readily implement and practice the present invention.

Figure 1:
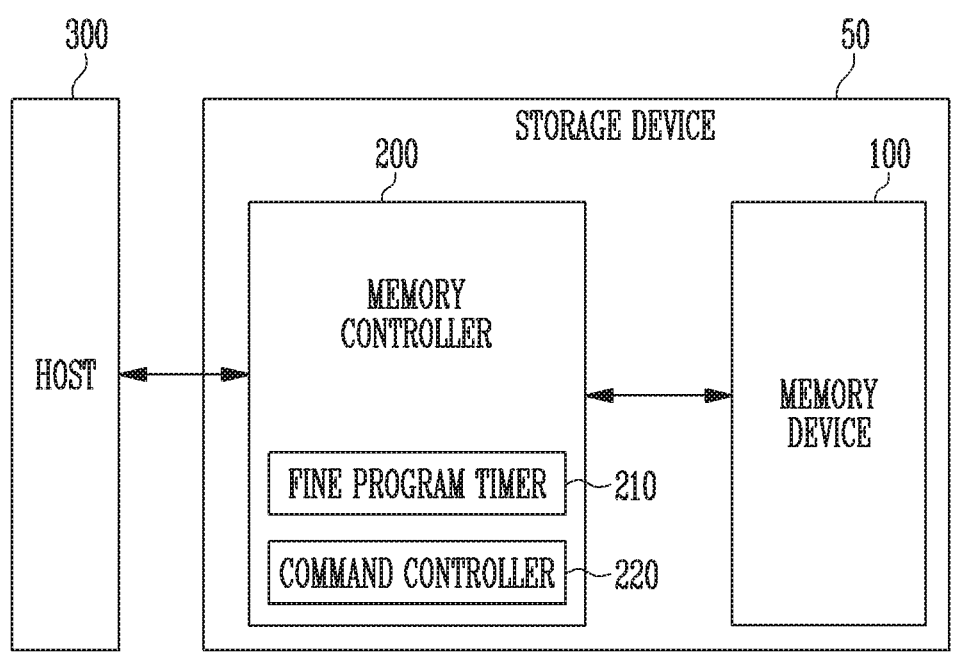
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 may be a device for storing data under the control of a host 300, such as a mobile phone, a smart phone, an MP3 player, a laptop computer, a desktop computer, a game console, a TV, a tablet PC or an in-vehicle infotainment.

The storage device 50 may be manufactured as any one of various types of storage devices according to a host interface that is a communication scheme with the host 300. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells, and the plurality of memory cells may constitute a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

In an embodiment, the memory device 100 may be implemented in a two-dimensional array structure or three-dimensional array structure. Hereinafter, a case where the memory device 100 is implemented in the three-dimensional array structure is described as an embodiment, the present disclosure is not limited to the three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, the memory device 100 may be operated using a Single Level Cell (SLC) scheme in which one data bit is stored in one memory cell. Alternatively, the memory device 100 may be operated using a scheme in which at least two data bits are stored in one memory cell. For example, the memory device 100 may be operated using a Multi-Level Cell (MLC) scheme in which two data bits are stored in one memory cell, a Triple Level Cell (TLC) scheme in which three data bits are stored in one memory cell, or a Quadruple Level Cell (QLC) scheme in which four data bits are stored in one memory cell.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation according to the received command. For example, when a program command is received, the memory device 100 may program data in the area selected by the address. When a read command is received, the memory device 100 may read data from the area selected by the address. When an erase command is received, the memory device 100 may erase data stored in the area selected by the address.

The memory controller 200 may include a fine program timer 210.

In an embodiment, the fine program timer 210 may record a foggy program completion time at which a foggy program completion response is received from the memory device 100. The foggy program completion response may be a response representing that a program operation corresponding to a foggy program command has been completed in a foggy-fine program operation.

Subsequently, the fine program timer 210 may measure an elapsing amount of time from the foggy program completion time. When the elapsing amount of time from the foggy program completion time exceeds a reference amount of time, the fine program timer 210 may output dummy program instruction information.

In an embodiment, the fine program timer 210 may reset a foggy program completion time whenever a foggy program completion response is received from the memory device 100. That is, when the fine program timer 210 receives a foggy program completion response, the fine program timer 210 may reset the foggy program completion time that was previously recorded for each page, and record a foggy program completion time at which the fine program timer 210 receives a new foggy program completion response. Subsequently, when an elapsing amount of time from the foggy program completion time exceeds the reference amount of time, the fine program timer 210 may output dummy program instruction information.

The memory controller 200 may include a command controller 220.

In an embodiment, the command controller 220 may receive a foggy-fine program request from the host 300, and output a command corresponding to the foggy-fine program request.

First, the command controller 220 may output, to the memory device 100, a foggy program command for performing a foggy program operation in the memory device 100. Subsequently, when an elapsing amount of time from a foggy program completion time exceeds a reference amount of time, the command controller 220 may output, to the memory device 100, a fine program command for performing a fine program operation in the memory device.

When a page on which the fine program operation is to be performed is influenced by interference, the command controller 220 may output a dummy program command for performing a dummy program operation. When the dummy program operation is performed in response to the dummy program command, the command controller 220 may output a fine program command. Subsequently, the command controller 220 may repeatedly output the dummy program command and the fine program command until a foggy-fine program operation is completed.

The memory controller 200 may control overall operations of the storage device 50.

When a power voltage is applied to the storage device 50, the memory controller 200 may execute firmware (FW). When the memory device 100 is a flash memory device, the memory controller 200 may execute FW such as an FTL for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells included in the memory device 100, in which data is to be stored. Also, the memory controller 200 may store, in a buffer memory therein, a logical-physical address mapping table that establishes a mapping relationship between the LBA and the PBA.

The memory controller 200 may control the memory device 100 to perform a program operation, a read operation, an erase operation, or the like in response to a request from the host 300. For example, when a program request is received from the host 300, the memory controller 200 may change the program request into a program command, and provide the memory device 100 with the program command, a PBA, and data. When a read request is received together with an LBA from the host 300, the memory controller 200 may change the read request into a read command, select a PBA corresponding to the LBA, and then provide the memory device 100 with the read command and the PBA. When an erase request is received together with an LBA from the host 300, the memory controller 200 may change the erase request into an erase command, select a PBA corresponding to the LBA, and then provide the memory device 100 with the erase command and the PBA.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform background operations such as a program operation for wear leveling and a program operation for garbage collection.

In an embodiment, the storage device 50 may further include a buffer memory (not shown). The memory controller 200 may control data exchange between the host 300 and the buffer memory. Alternatively, the memory controller 200 may temporarily store system data for controlling the memory device 100 in the buffer memory. For example, the memory controller 200 may temporarily store data input from the host 300 in the buffer memory, and then transmit the data temporarily stored in the buffer memory to the memory device 100.

In various embodiments, the buffer memory may be used as a working memory or cache memory of the memory controller 200. The buffer memory may store codes or commands executed by the memory controller 200. Alternatively, the buffer memory may store data processed by the memory controller 200.

In an embodiment, the buffer memory may be implemented with a Dynamic Random Access Memory (DRAM) such as a Double Data Rate Synchronous DRAM (DDR SDRAM), a DDR4 SDRAM, a Low Power Double Data Rate 4 (LPDDR4) SDRAM, a Graphics Double Data Rate (GDDR) SRAM, a Low Power DDR (LPDDR), or a Rambus Dynamic Random Access Memory (RDRAM), or a Static Random Access Memory (SRAM).

In various embodiments, the buffer memory may be coupled to the storage device 50 at the outside of the storage device 50. Therefore, volatile memory devices 100 coupled to the storage device 50 at the outside of the storage device 50 may perform functions of the buffer memory.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

Figure 2:
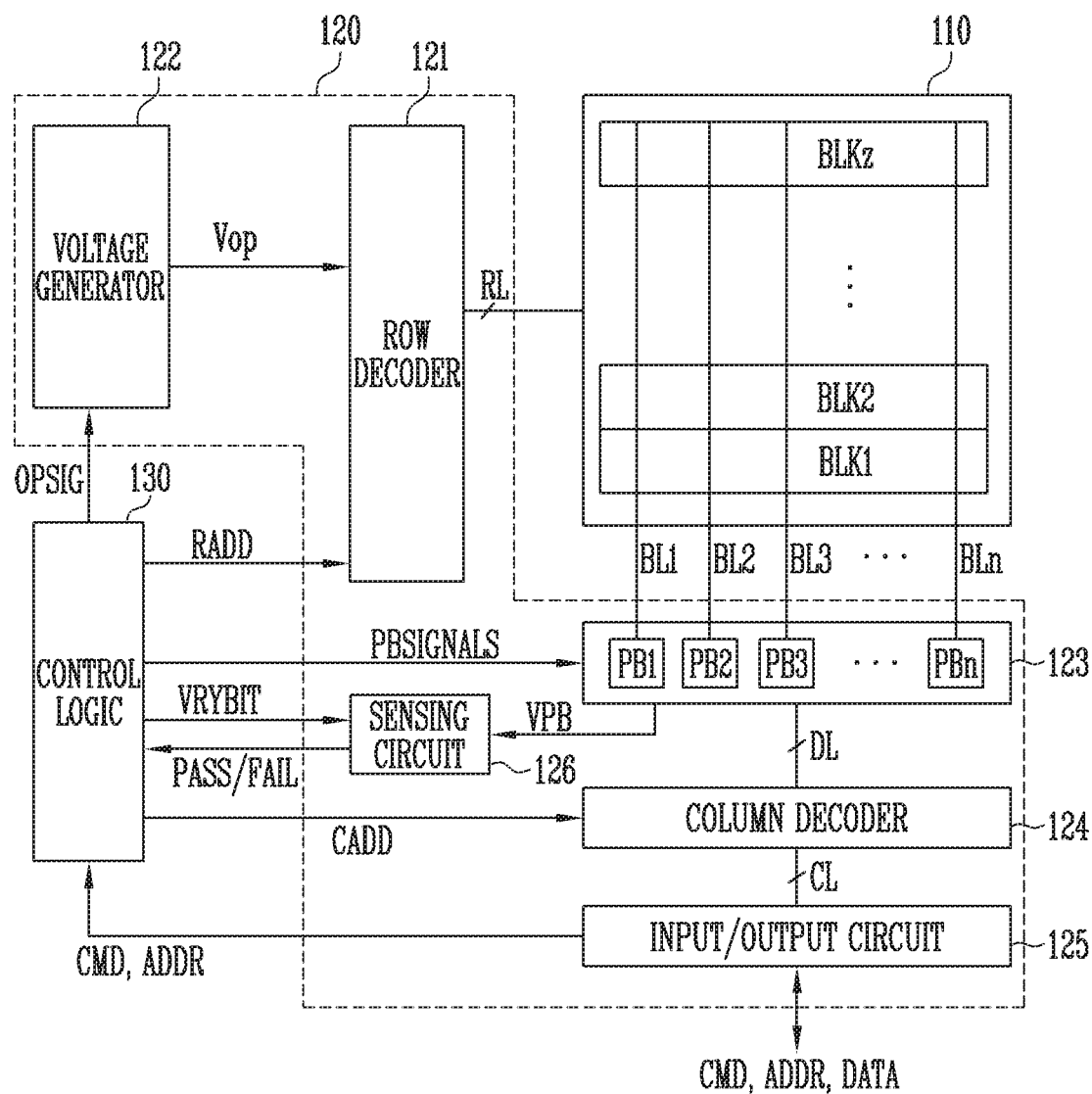
FIG. 2 is a diagram illustrating a structure of a memory device shown in FIG. 1.

FIG. 2 is a diagram illustrating a structure of the memory device shown in FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. The plurality of memory blocks BLK1 to BLKz are coupled to a page buffer group 123 through bit lines BL1 to BLn. Each of the plurality of memory blocks BLK1 to BLKz includes a plurality of memory cells. In an embodiment, the plurality of memory cells may be nonvolatile memory cells. Memory cells coupled to the same word line may be defined as one page. Therefore, one memory block may include a plurality of pages.

The row lines RL may include at least one source select line, a plurality of word lines, and at least one drain select line.

Each of the memory cells included in the memory cell array 110 may be configured as a Single Level Cell (SLC) storing one data bit, a Multi-Level Cell (MLC) storing two data bits, a Triple Level Cell (TLC) storing three data bits, or a Quadruple Level Cell (QLC) storing four data bits.

The peripheral circuit 120 may perform a program operation, a read operation or an erase operation on a selected region of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, the voltage generator 122, the page buffer group 123, a column decoder 124, an input/output circuit 125, and a sensing circuit 126.

The row decoder 121 is coupled to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 decodes row address RADD received from the control logic 130. The row decoder 121 selects at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage having a level higher than that of the verify voltage to the unselected word lines.

In a read operation, the row decoder 121 may apply a read voltage to the selected word line, and apply a read pass voltage having a level higher than that of the read voltage to the unselected word lines.

In an embodiment, an erase operation of the memory device 100 is performed in a memory block unit. In the erase operation, the row decoder 121 may select one memory block according to the decoded address. In the erase operation, the row decoder 121 may apply a ground voltage to word lines coupled to the selected memory blocks.

The voltage generator 122 operates under the control of the control logic 130. The voltage generator 122 generates a plurality of voltages by using an external power voltage supplied to the memory device 100. Specifically, the voltage generator may generate various operating voltages Vop used in program, read, and erase operations in response to an operation signal OPSIG. For example, the voltage generator 122 may generate a program voltage, a verify voltage, a pass voltage, a read voltage, an erased voltage, and the like under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage.

For example, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The page buffer group 123 includes first to nth page buffers PB1 to PBn. The first to nth page buffers PB1 to PBn are coupled to the memory cell array 110 respectively through first to nth bit lines BL1 to BLn. The first to nth page buffers PB1 to PBn operate under the control of the control logic 130. Specifically, the first to nth page buffers PB1 to PBn may operate in response to page buffer control signals PBSIGNALS. For example, the first to nth page buffers PB1 to PBn may temporarily store data received through the first to nth bit lines BL1 to BLn, or sense voltages or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page are programmed according to the transferred data DATA. In a program verify operation, the first to nth page buffers PB1 to PBn read page data by sensing voltages or currents received from the selected memory cells through the first to nth bit lines BL1 to BLn.

In a read operation, the first to nth page buffers PB1 to PBn read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn or apply an erase voltage.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass or fail signal PASS/FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIG- NALS, and the allow bit VRYBIT in response to the command CMD and the address ADDR. For example, the control logic 130 may control a read operation of a selected memory block in response to a sub-block read command and an address. Also, the control logic 130 may control an erase operation a selected sub-block included in the selected memory block in response to a sub-block erase command and an address. Also, the control logic 130 may determine whether the verify operation has passed or failed in response to the pass or fail signal PASS or FAIL.

Each of the memory cells included in the memory cell array 110 may be programmed to any one program state among a plurality of program states according to data stored therein. A target program state of a memory cell may be determined as any one of the plurality of program states according to data stored in the memory cell.

Figure 3:
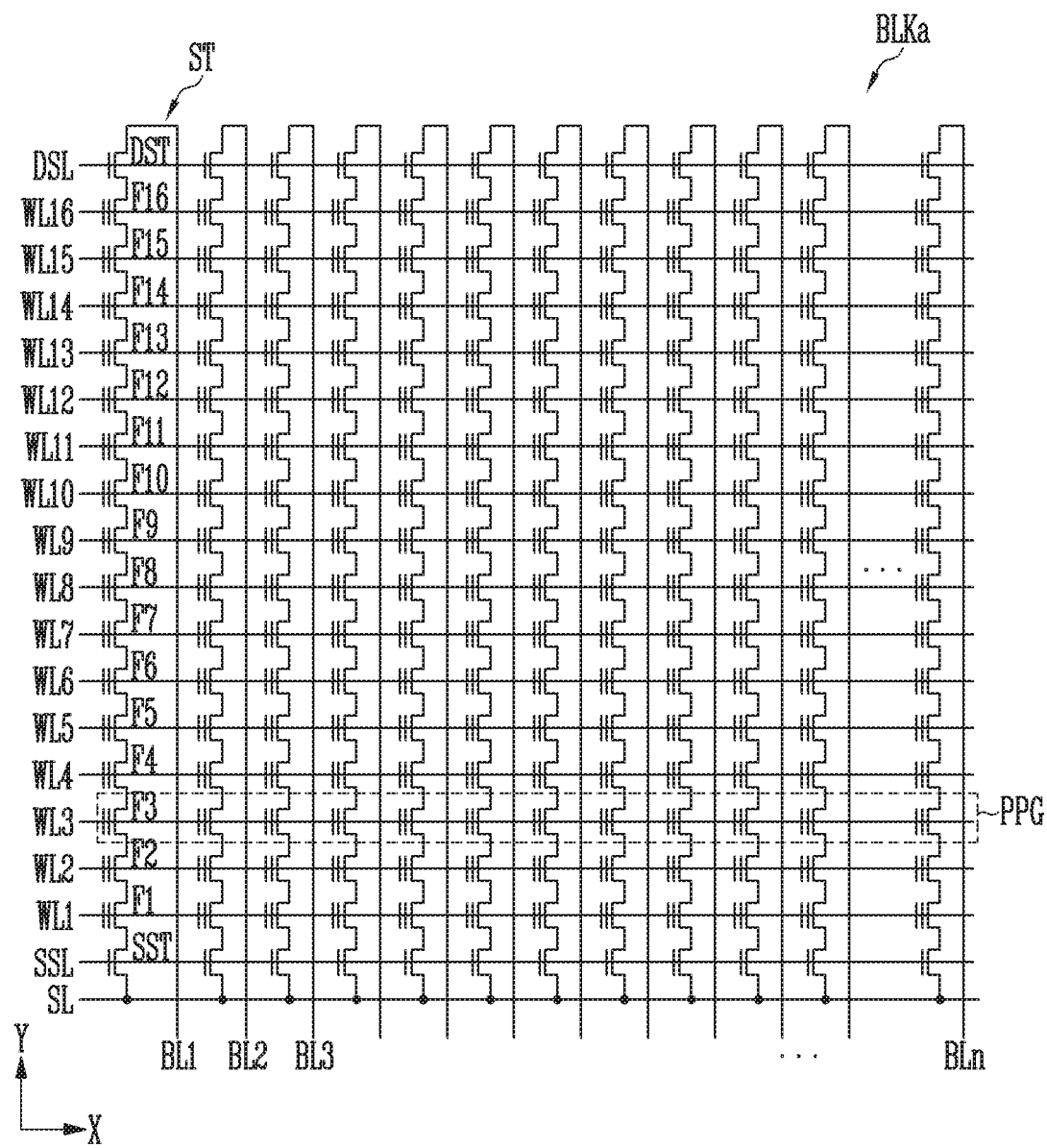
FIG. 3 is a diagram illustrating a memory block.

FIG. 3 is a diagram illustrating a memory block.

Referring to FIGS. 2 and 3, FIG. 3 is a circuit diagram illustrating any one memory block BLKa among the plurality of memory blocks BLK1 to BLKz included in the memory cell array 110 shown in FIG. 2.

In the memory block BLKa, a first select line, word lines, and a second select line, which are arranged in parallel, may be coupled to each other. For example, the word lines may be arranged in parallel between the first and second select lines. The first select line may be a source select line SSL, and the second select line may be a drain select line DSL.

More specifically, the memory block BLKa may include a plurality of strings coupled between bit lines BL1 to BLn and a source line SL. The bit lines BL1 to BLn may be respectively coupled to the strings, and the source line SL may be commonly coupled to the strings. The strings may be configured identically to one another, and therefore, a string ST coupled to a first bit line BL1 will be described in detail as an example.

The string ST may include a source select transistor SST, a plurality of memory cells F1 to F16, and a drain select transistor DST, which are coupled in series to each other between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors SST included in different strings may be coupled to the source select line SSL, and gates of drain select transistors DST included in different strings may be coupled to the drain select line DSL. Gates of the memory cells F1 to F16 may be coupled to a plurality of word lines WL1 to WL16. A group of memory cells coupled to the same word line among memory cells included in different strings may be referred to as a physical page PPG. Therefore, physical pages corresponding to the number of the word lines WL1 to WL16 may be included in the memory block BLKa.

One memory cell may store data of one bit. The memory cell is generally referred to as a single level cell (SLC). One physical page PPG may store one logical page (LPG) data. The one LPG data may include data bits of which number corresponds to that of cells included in one physical page PPG. Alternately, one memory cell MC may store data of two or more bits. The memory cell is generally referred to as a multi-level cell (MLC). One physical page PPG may store two or more LPG data.

A memory cell for storing data of two or more bits is referred to as the MLC. As the number of bits of data stored in one memory cell increases, the MLC has recently meant as a memory cell for storing data of two bits. A memory cell for storing data of three bits is referred to as a triple level cell (TLC), and a memory cell for storing data of four bits is referred to as a quadruple level cell (QLC). Besides, memory cells for storing data of a plurality of bits have been developed, and this embodiment may be applied to memory systems in which data of two or more bits are stored.

In another embodiment, each of the plurality of memory blocks may have a three-dimensional structure. Each memory block may include a plurality of memory cells stacked on a substrate. The plurality of memory cells may be arranged along +X, +Y, and +Z directions.

FIGS. 4A to 4D are diagrams illustrating an embodiment of a foggy-fine program.

The horizontal axis illustrated in FIGS. 4A to 4D represents threshold voltages Vth of memory cells, and the vertical axis of each of FIGS. 4A to 4D represents numbers of memory cells. In FIGS. 4A to 4D, a case where memory cells are programmed using a Triple Level Cell (TLC) scheme is assumed.

Referring to FIG. 4A, memory cells may be in an erase state E before the memory cells are programmed. The memory cells of the erase state E may be programmed to first to seventh program states P1 to P7 through a program operation.

Referring to FIG. 4B, in an embodiment, lower page data of the memory cells of the erase state E may be programmed. That is, before a foggy-fine program operation is performed, the lower page data of the memory cells may be programmed. Therefore, when the lower page data of the memory cells of the erase state E is programmed, the memory cells may be in any one of the erase state E and an LP-th program state LP.

Subsequently, the memory device 100 may perform a foggy program operation by receiving a foggy program command corresponding to a foggy-fine program request from the memory controller 200.

Referring to FIG. 4C, by the foggy program operation, the memory cells of the erase state E may be programmed to the first to third program states P1 to P3, and the memory cells of the LP-th program state LP may be programmed to the fourth to seventh program state P4 to P7.

When the foggy program operation is completed, the memory device 100 may perform a fine program operation by receiving a fine program command corresponding to the foggy-fine program request from the memory controller 200.

Referring to FIG. 4D, the memory device 100 may more finely tune threshold voltage distributions of the memory cells of the erase state E and the first to seventh program states P1 to P7, through the fine program operation. That is, although the memory cells of the erase state E and the first to seventh program states P1 to P7 are programmed by the foggy program operation, the threshold voltage distributions are not clearly distinguished, but the threshold voltage distributions of the memory cells of the erase state E and the first to seventh program states P1 to P7 may be clearly distinguished through the fine program operation.

Consequently, when the memory device 100 performs the foggy-fine program operation, the memory cells can have any one of the erase state E and the first to seventh program states P1 to P7 through operations corresponding to the foggy program command and the fine program command, after lower page data is programmed.

Figure 5A:
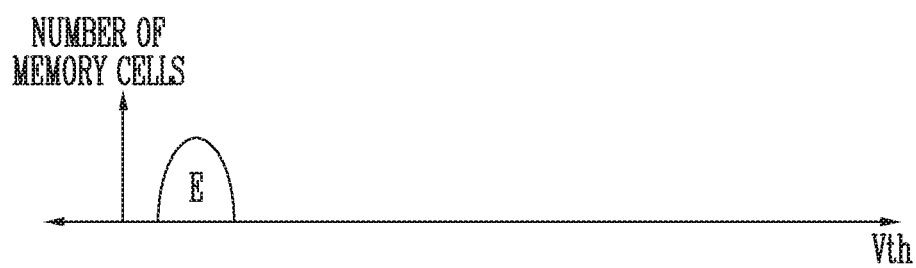
FIGS. 5A to 5C are diagrams illustrating another embodiment of the foggy-fine program.
Figure 5B:
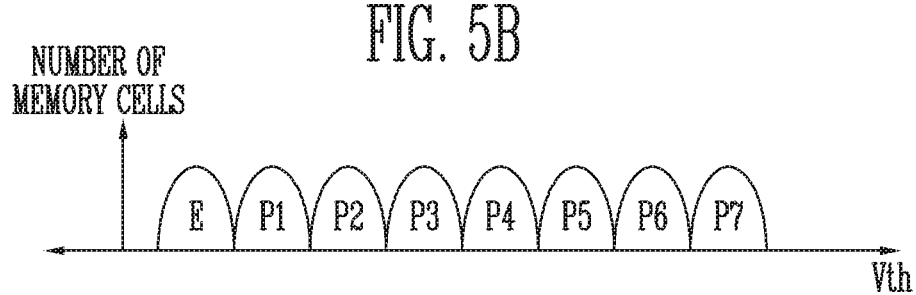
Figure 5C:
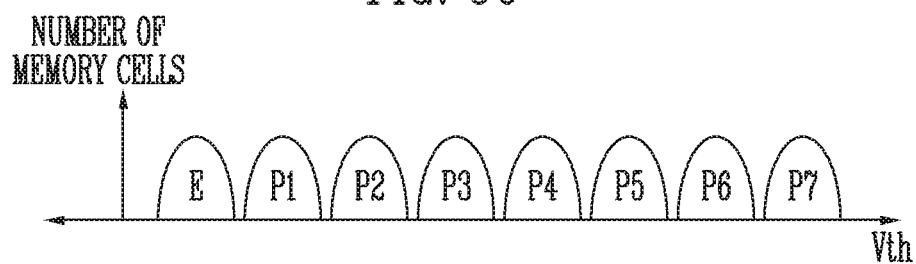

FIGS. 5A to 5C are diagrams illustrating another embodiment of the foggy-fine program.

FIGS. 5A to 5C illustrate the foggy-fine program from which FIG. 4B is omitted. In FIGS. 5A to 5C, a case where memory cells are programmed using a Triple Level Cell (TLC) scheme is assumed.

In FIGS. 5A to 5C, contents/descriptions overlapping with those shown in FIG. 4 will be omitted for convenience of description.

Referring to FIG. 5A, memory cells included in the memory device 100 may be in an erase state E before the memory cells are programmed. The memory cells of the erase state E may have any one state among first to seventh program states P1 to P7 through a foggy-fine program operation.

In an embodiment, the memory controller 200 may receive a foggy-fine program request from the host 300, and output a foggy program command and a fine program command, which correspond to the foggy-fine program request.

FIG. 5B illustrates threshold voltage distributions of the memory cells after the memory device 100 performs a foggy program operation corresponding to the foggy program command, and FIG. 5C illustrates threshold voltage distributions of the memory cells after the memory device 100 performs a fine program operation corresponding to the fine program command.

Unlike FIGS. 4A to 4D, the memory cells included in the memory device 100 does not perform a program operation on lower page data, and may immediately perform the foggy program operation. That is, when the memory device 100 receives a foggy program command and performs a foggy program operation corresponding to the foggy program command, threshold voltage distributions of the memory cells may be formed as illustrated in FIG. 5B.

Subsequently, the memory device 100 may receive a fine program command from the memory controller 200, and perform a fine program operation corresponding to the fine program command. When the memory device 100 performs the fine program operation, threshold voltage distributions of the memory cells may be formed as illustrated in FIG. 5C.

Consequently, the memory cells can have threshold voltage distributions of the first to seventh program states P1 to P7 by performing the foggy-fine program operation in the erase state E.

FIGS. 6A to 6D are diagrams illustrating a foggy-fine program when degradation caused by retention occurs.

Figure 6A:
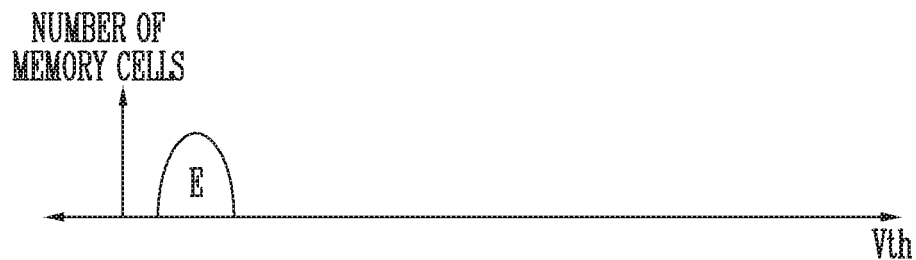
FIGS. 6A to 6D are diagrams illustrating a foggy-fine program when degradation caused by retention occurs.
Figure 6B:
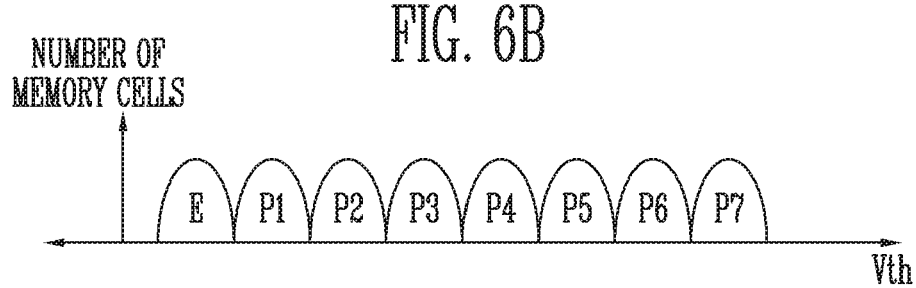
Figure 6C:
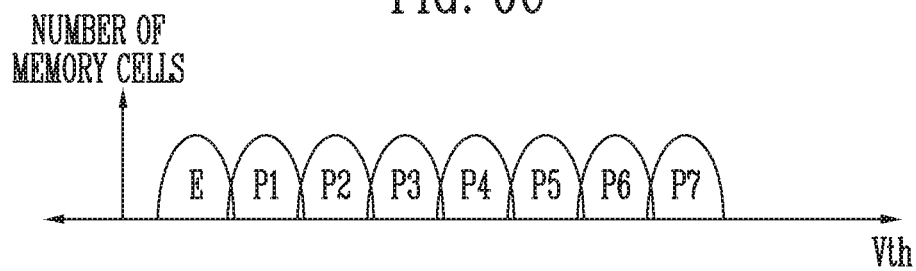
Figure 6D:
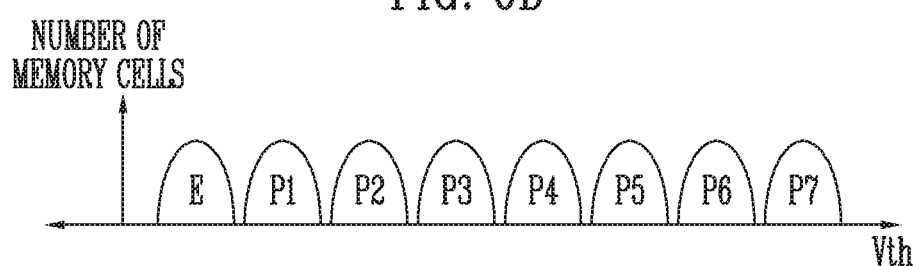

FIGS. 6A and 6B are identical to FIGS. 5A and 5B, and FIG. 6D is identical to FIG. 5C. Therefore, in FIGS. 6A to 6D, contents/descriptions overlapping with those shown in FIGS. 5A to 5C will be omitted for convenience of description.

FIGS. 6A to 6D illustrate changes in threshold voltage distributions of memory cells according to a fine program performed when degradation caused by retention occurs after a foggy program.

In an embodiment, memory cells included in the memory device 100 may be programmed from an erase state E to first to seventh program states P1 to P7 through a foggy-fine program. However, after a foggy program, threshold voltage distributions of the memory cells may be changed due to degradation caused by retention.

Referring to FIG. 6C, after the memory cells are foggy-programmed, the threshold voltages of the first to seventh program states P1 to P7 may be changed. That is, although the memory cells have been programmed to the first to seventh program states P1 to P7 through a foggy program operation, threshold voltages of the memory cells are decreased due to degradation caused by retention, and therefore, threshold voltage distributions of the memory cells may be formed as illustrated in FIG. 6C.

Subsequently, the memory device 100 may receive a fine program command from the memory controller 200, and perform a fine program operation corresponding to the fine program command. That is, the memory cells may be degraded by retention after the foggy program operation is performed, but the program states of the memory cells may be more finely tuned through the fine program operation. Through the fine program operation, the memory cells may have threshold voltage distributions as illustrated in FIG. 6D.

Consequently, although the memory cells are influenced by degradation caused by retention after the foggy program operation is performed, the memory cells can have threshold voltage distributions more finely tuned through the fine program operation.

FIGS. 7A to 7C are diagrams illustrating a foggy-fine program when the memory device performs a program operation by using a quadruple level cell scheme.

FIGS. 7A to 7C illustrate a process of performing a foggy-fine program when memory cells included in the memory device 100 are programmed using a Quadruple Level Cell (QLC) scheme. The horizontal axis of each of FIGS. 7A to 7C represents threshold voltages of the memory cells, and the vertical axis of each of FIGS. 7A to 7C represents numbers of the memory cells.

Referring to FIG. 7A, the memory cells included in the memory device 100 may be in an erase state E before the memory cells are programmed. The memory cells of the erase state E may have any one state among first to fifteenth program states P1 to P15 through a foggy-fine program operation.

In an embodiment, the memory controller 100 may receive a foggy-fine program request from the host 300, and output a foggy program command and a fine program command, which correspond to the foggy-fine program request.

FIG. 7B illustrates threshold voltage distributions of the memory cells after the memory device 100 performs a foggy program operation corresponding to the foggy program command, and FIG. 7C illustrates threshold voltage distributions of the memory cells after the memory device 100 performs a fine program operation corresponding to the fine program command.

Referring to FIGS. 5A to 5C and 7A to 7C, like the memory cells shown in FIGS. 5A to 5C, the memory cells shown in FIGS. 7A to 7C does not perform a program operation on lower page data, and may immediately perform the foggy program operation.

In an embodiment, when the memory device 100 receives a foggy program command from the memory controller 200 and perform a foggy program operation corresponding to the foggy program command, threshold voltage distributions of the memory cells may be formed as illustrated in FIG. 7B.

Subsequently, the memory device 100 may receive a fine program command from the memory controller 200 and perform a fine program operation corresponding to the fine program command. When the memory device 100 performs the fine program operation, threshold voltage distributions of the memory cells are more finely tuned, to be formed as illustrated in FIG. 7C.

Consequently, the memory cells can have threshold voltage distributions of the first to fifteenth program states P1 to P15 by performing the foggy-fine program operation in the erase state E.

Figure 8:
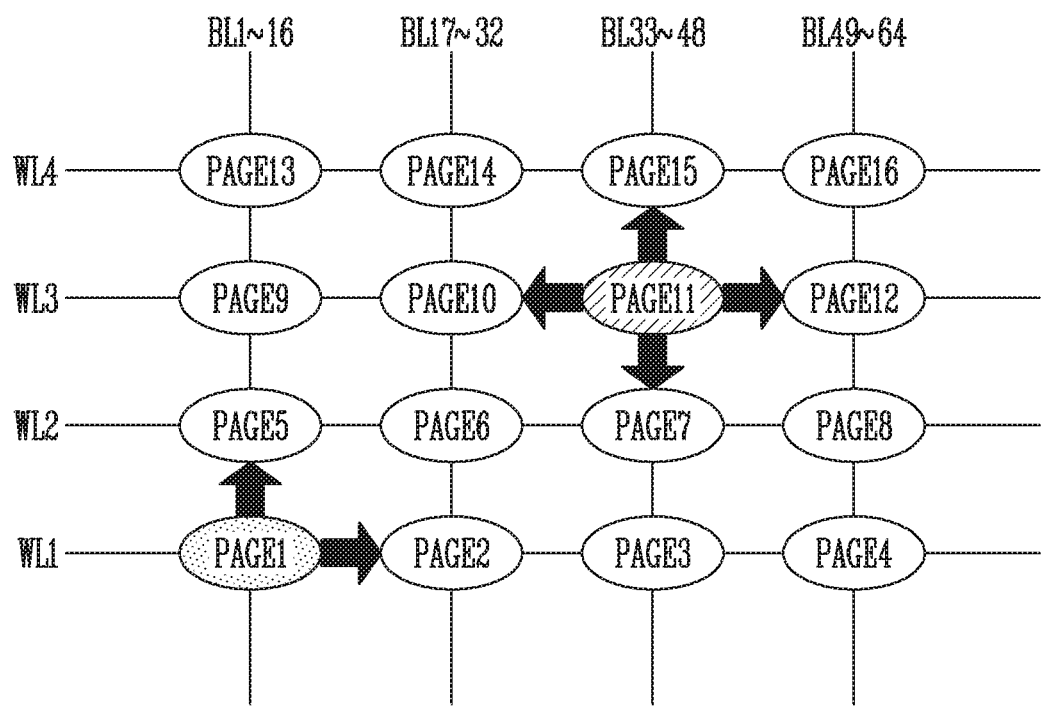
FIG. 8 is a diagram illustrating interference for determining whether a dummy program operation is to be performed.

FIG. 8 is a diagram illustrating interference for determining whether a dummy program operation is to be performed.

Referring to FIGS. 2 and 8, FIG. 8 illustrates pages including memory cells coupled to some of the word lines and some of the bit lines, which are shown in FIG. 2. Referring to FIG. 8, each of first to sixteenth pages PAGE1 to PAGE16 may include sixteen memory cells.

In an embodiment, a plurality of memory cells may be coupled to one word line, and constitute a plurality of pages.

For example, memory cells coupled to a first word line WL1 may constitute first to fourth pages PAGE1 to PAGE4, and each page may include sixteen memory cells. Sixteen memory cells included in the first page PAGE1 of the first word line WL1 may be respectively coupled to first to sixteenth bit lines BL1 to BL16, sixteen memory cells included in the second page PAGE2 of the first word line WL1 may be respectively coupled to seventeenth to thirty-second bit lines BL17 to BL32, sixteen memory cells included in the third page PAGE3 of the first word line WL1 may be respectively coupled to thirty-third to forty-eighth bit lines BL33 to BL48, and sixteen memory cells included in the fourth page PAGE4 of the first word line WL1 may be respectively coupled to forty-ninth to sixty-fourth bit lines BL49 to BL64.

In the same manner as described above, memory cells coupled to a second word line WL2 may constitute fifth to eighth pages PAGE5 to PAGE8, memory cells coupled to a third word line WL3 may constitute ninth to twelfth pages PAGE9 to PAGE12, and memory cells coupled to a fourth word line WL4 may constitute thirteenth to sixteenth pages PAGE13 to PAGE16. The memory cells included in the pages of each word line may be respectively coupled to the first to sixty-fourth bit lines BL1 to BL64.

In an embodiment, when the memory device 100 performs a foggy-fine program operation, the memory device 100 may perform the foggy-fine program operation by considering interference between adjacent cells. In particular, when a number of bits programmed in each memory cell increases, interference between adjacent cells becomes severe, and hence the memory device 100 may perform a program operation by considering whether memory cells are adjacent cells, when the memory device 100 performs the foggy-fine program operation.

In an example, when a program operation on the first page PAGE1 coupled to the first word line WL1 is performed, the second and fifth pages PAGE2 and PAGE5 that are pages adjacent to the first page PAGE1 may be influenced by interference. Therefore, after a foggy program operation or dummy program operation on the second and fifth pages PAGE2 and PAGE5 is performed, a fine program operation on the first page PAGE1 may be performed.

Specifically, when the memory device 100 receives data to be programmed to the second and fifth pages PAGE2 and PAGE5 from the memory controller 200, a fine program operation on the first page PAGE1 may be performed after a foggy program operation on the second and fifth pages PAGE2 and PAGE5 is performed. However, although the memory device 100 receives the data to be programmed to the second and fifth pages PAGE2 and PAGE5 from the memory controller 200, the memory device 100 may perform the fine program operation on the first page PAGE1, after the memory device 100 performs a dummy program operation on the second and fifth pages PAGE2 and PAGE5.

In another example, when a program operation on the eleventh page PAGE11 coupled to the third word line WL3 is performed, the seventh, tenth, twelfth, and fifteenth pages PAGE7, PAGE10, PAGE12, and PAGE15 adjacent to the eleventh page PAGE11 may be influenced by interference. Therefore, when the memory device 100 receives data to be programmed to the seventh, tenth, twelfth, and fifteenth pages PAGE7, PAGE10, PAGE12, and PAGE15 from the memory controller 200, a foggy program operation on the seventh, tenth, twelfth, and fifteenth pages PAGE7, PAGE10, PAGE12, and PAGE15 may be performed. When the memory device 100 receives the data to be programmed to the seventh, tenth, twelfth, and fifteenth pages PAGE7, PAGE10, PAGE12, and PAGE15 from the memory controller 200, the memory device 100 may perform a fine program operation on the eleventh page PAGE11, after the memory device 100 performs a dummy program operation on seventh, tenth, twelfth, and fifteenth pages PAGE7, PAGE10, PAGE12, and PAGE15.

FIG. 9 is a diagram illustrating a foggy-fine program operation sequence.

Referring to FIGS. 8 and 9, a first column shown in FIG. 9 represents the pages shown in FIG. 8, a second column shown in FIG. 9 represents a sequence of foggy program operations in a foggy-fine program operation, and a third column shown in FIG. 9 represents a sequence of fine program operations in the foggy-fine program operation. The first to fourth pages PAGE1 to PAGE4 among the pages shown in FIG. 9 may be coupled to the first word line WL1, the fifth to eighth pages PAGE5 to PAGE8 may be coupled to the second word line WL2, and the ninth to twelfth pages PAGE9 to PAGE12 may be coupled to the third word line WL3.

In an embodiment, when the memory device 100 performs a program operation, the program operation may be sequentially performed from the first page PAGE1 to the twelfth page PAGE12. However, when the memory device 100 performs the foggy-fine program operation, the sequence of foggy program operations and fine program operations may be rearranged.

For example, after a foggy program operation 1 on the first page PAGE1, a foggy program operation 2 on the second page PAGE2, a foggy program operation 3 on the third page PAGE3, and a foggy program operation 4 on the fourth page PAGE4 may be sequentially performed. Subsequently, when a foggy program operation 5 on the fifth page PAGE5 is performed, a fine program operation 6 on the first page PAGE1 may be performed. That is, after a foggy program operation on the second and fifth pages PAGE2 and PAGE5 adjacent to the first page PAGE1 is performed, a fine program operation on the first page PAGE1 may be performed. This is for the purpose of minimizing influence of interference between adjacent memory cells.

After a fine program operation on the first page PAGE1 is performed, the memory device 100 may perform a foggy program operation for performing a fine program operation on the page on which the foggy program operation is performed.

For example, in order to perform a fine program operation 8 on the second page PAGE2, a foggy program operation 7 may be first performed on the sixth page PAGE6. That is, after a foggy program operation is performed on the first, third, and sixth pages PAGE1, PAGE3, and PAGE6 adjacent to the second page PAGE2, a fine program operation may be performed on the second page PAGE2. Therefore, after the foggy program operation 7 is performed on the sixth page PAGE6, the fine program operation 8 may be performed on the second page PAGE2.

In an embodiment, in the same manner as the fine program operation is performed on the second page PAGE2, a fine program operation 10 may be performed on the third page PAGE3 after a foggy program operation 9 is performed on the seventh page PAGE7, a fine program operation 12 may be performed on the fourth page PAGE4 after a foggy program operation 11 is performed on the eighth page PAGE8, a fine program operation 14 may be performed on the fifth page PAGE5 after a foggy program operation 13 is performed on the ninth page PAGE5, a fine program operation 16 may be performed on the sixth page PAGE6 after a foggy program operation 15 is performed on the tenth page PAGE10, a fine program operation 18 may be performed on the seventh page PAGE7 after a foggy program operation 17 is performed on the eleventh page PAGE11, and a fine program operation 20 may be performed on the eighth page PAGE8 after a foggy program operation 19 is performed on the twelfth page PAGE12.

However, when a long time is taken until a fine program operation is performed after a foggy program operation is performed, the probability that a program fail will occur may be increased. That is, when the fine program operation is delayed, the program fail may occur. Therefore, in the present disclosure, the fine program operation may be performed by measuring an elapsing amount of time after the foggy program operation is completed.

Hereinafter, a method for performing a fine program operation, based on an elapsing amount of time from the foggy program completion time at which a foggy program operation is completed, will be described.

Figure 10:
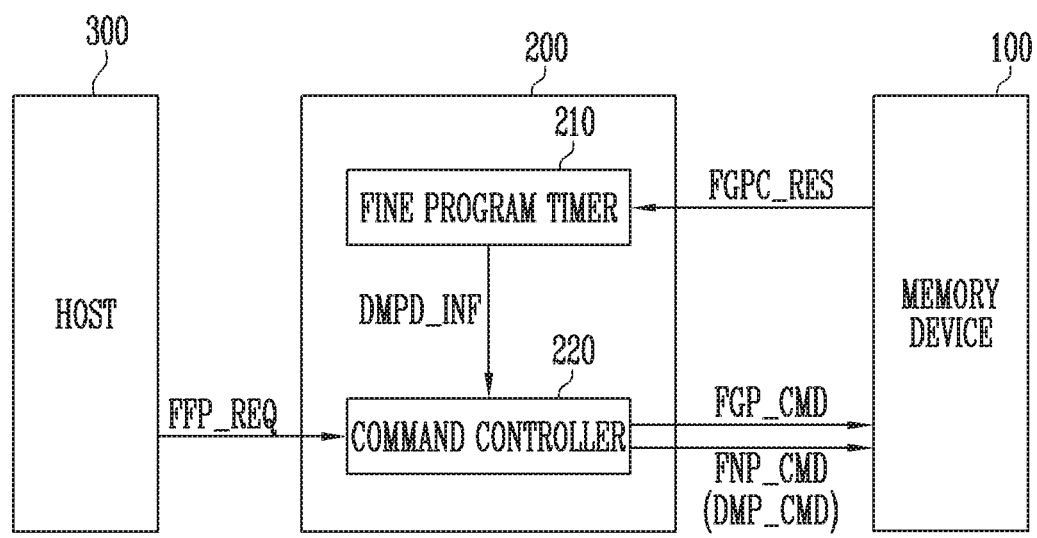
FIG. 10 is a diagram illustrating a configuration of a memory controller for performing a foggy-fine program operation in accordance with the present disclosure.

FIG. 10 is a diagram illustrating a configuration of the memory controller for performing a foggy-fine program operation in accordance with the present disclosure.

Referring to FIG. 10, the memory controller 200 may include the fine program timer 210 and the command controller 220.

In an embodiment, the command controller 220 may receive a foggy-fine program request FFP_REQ from the host 300. The command controller 220 may output a foggy program command FGP_CMD or fine program command FNP_CMD to the memory device 100, based on the foggy-fine program request FFP_REQ.

Since a foggy program operation is first performed during the foggy program operation and a fine program operation, the command controller 220 may first output the foggy program command FGP_CMD to the memory device 100. The memory device 100 may perform a foggy program operation corresponding to the foggy program command FGP_CMD and then output a foggy program completion response FGPC_RES to the fine program timer 210.

The fine program timer 210 may record, for each page, a foggy program completion time at which the fine program timer 210 receives the foggy program completion response FGPC_RES from the memory device 100. Also, when an elapsing amount of time from the foggy program completion time at which the fine program timer 210 receives the foggy program completion response FGPC_RES exceeds a reference amount of time, the fine program timer 210 may output dummy program instruction information DMPD_INF.

In an embodiment, when the fine program timer 210 receives the foggy program completion response FGPC_RES from the memory device, before the elapsing amount of time from the foggy program completion time at which the fine program timer 210 receives the foggy program completion response FGPC_RES exceeds the reference amount of time, the foggy program completion times recorded with respect to the respective pages in the fine program timer 210 may be reset. The foggy program completion times recorded in the fine program timer 210 may be reset as a newly received foggy program completion time.

Subsequently, when an elapsing amount of time from the newly received foggy program completion time exceeds the reference amount of time, the fine program timer 210 may output dummy program instruction information DMPD_INF. The dummy program instruction information DMPD_INF may represent that the elapsing amount of time from the foggy program completion time has exceeded the reference amount of time. That is, in order to perform a fine program operation after a foggy program operation, the dummy program instruction information DMPD_INF may be output such that a dummy program operation is performed on an adjacent page on which a program operation is not performed.

In an embodiment, the command controller 220 may output a dummy program command DMP_CMD before the command controller 220 outputs the fine program command FNP_CMD. For example, when there exists a page on which a foggy program operation is not yet performed among pages adjacent to a page on which a fine program operation is to be performed, the dummy program command DMP_CMD may be output so as to dummy-program the corresponding page.

However, when the page on which the fine program operation is to be performed is not influenced by the interference from the adjacent pages, the dummy program command DMP_CMD may not be output. For example, when memory cells of the adjacent pages have already been programmed or when it is determined that a program operation is not performed on the memory cells of the adjacent pages, the dummy program command DMP_CMD may not be output before the fine program operation is performed.

In an embodiment, a Sudden Power Off (SPO) may occur. For example, an SPO may occur while the memory device 100 is performing a foggy program operation, a fine program operation, or a dummy program operation.

When the SPO occurs, the memory device 100 may again perform the program operation on another memory block instead of a memory block on which the program operation is being performed. The memory device 100 may again perform the program operation from the foggy program operation.

However, unlike the SPO, when a Normal Power Off (NPO) occurs, the program operation may be performed until all fine program operations on user data are completed. Hence, unlike the SPO, in the case of the NPO, it is unnecessary to again perform the program operation on another memory block from the foggy program operation. Therefore, when the NPO occurs, power may be off after all program operations on user data are ended.

Figure 11:
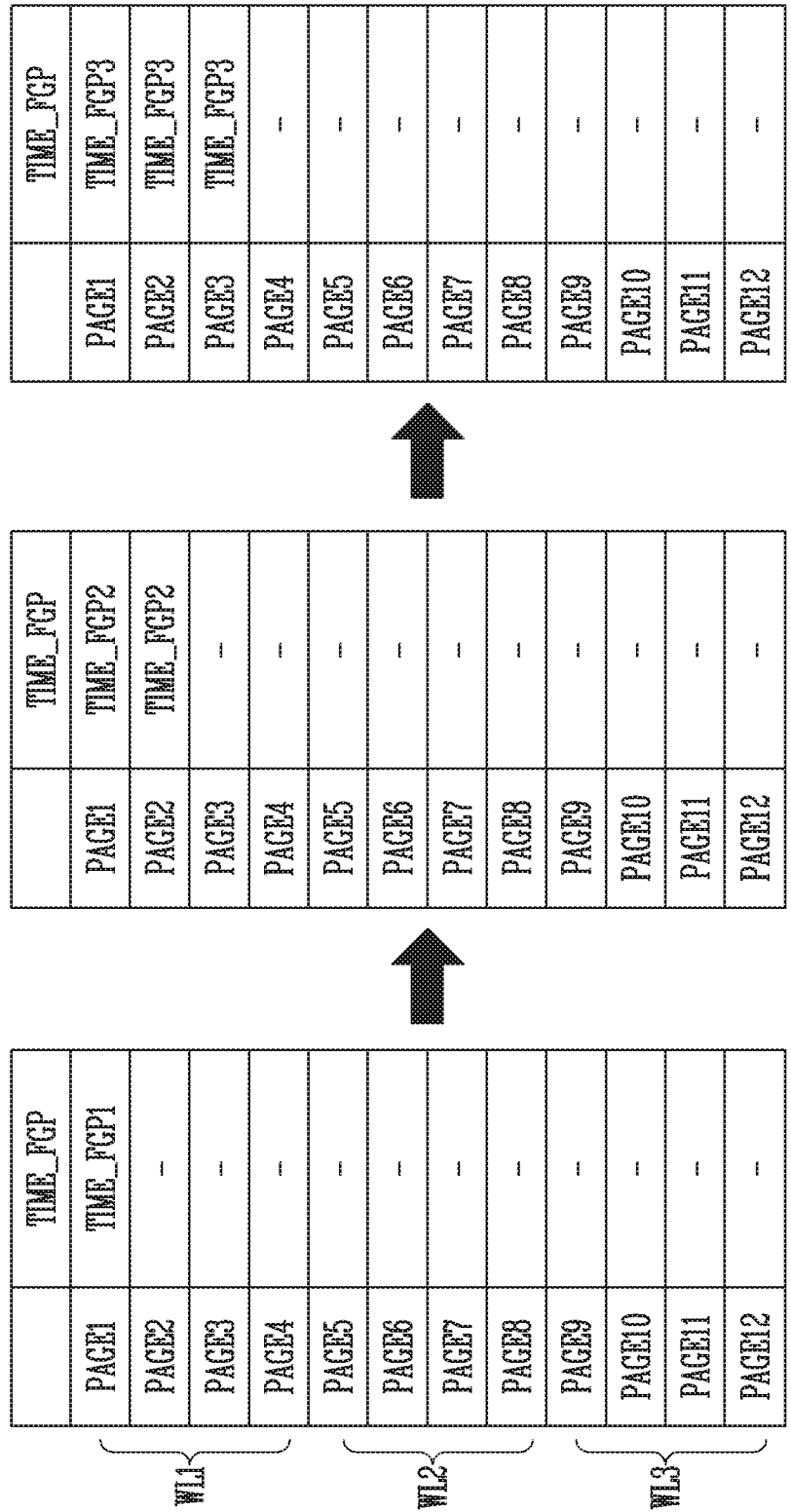
FIG. 11 is a diagram illustrating a foggy program completion time.

FIG. 11 is a diagram illustrating a foggy program completion time.

Referring to FIGS. 8 and 11, FIG. 11 illustrates a foggy program completion time TIME_FGP recorded for each page whenever a foggy program completion response is received.

In an embodiment, a foggy program operation on the first page PAGE1 may be performed. After the foggy program operation on the first page PAGE1 is performed, the fine program timer 210 may receive a foggy program completion response on the first page PAGE1 from the memory device.

After the fine program timer 210 receives the foggy program completion response, the fine program timer 210 may record a first foggy program completion time TIME_FGP1 that is a time at which the foggy program completion response is received as the foggy program completion time TIME_FGP on the first page PAGE1. Subsequently, the fine program timer 210 may measure an elapsing amount of time from the first foggy program completion time TIME_FGP1.

In an embodiment, before the elapsing amount of time from the first foggy program completion time TIME_FGP1 exceeds a reference amount of time, the fine program timer 210 may receive a foggy program completion response on the second page PAGE2. When the elapsing amount of time from the first foggy program completion time TIME_FGP1 exceeds the reference amount of time, the fine program timer 210 may output dummy program instruction information, and a dummy program command instructing a dummy program operation on adjacent pages may be output to the memory device 100 such that a fine program operation is performed on the first page PAGE1, based on the dummy program instruction information.

When the fine program timer 210 receives a second foggy program completion response before the elapsing amount of time from the first foggy program completion time TIME_FGP1 exceeds the reference amount of time, the fine program timer 210 may reset the foggy program completion time TIME_FGP. That is, when the second foggy program completion response is received, the first foggy program completion time TIME_FGP1 corresponding to the first page PAGE1, which was previously recorded, may be reset. The first foggy program completion time TIME_FGP1 may be reset as a second foggy program completion time TIME_FGP2 at which the second foggy program completion response is received.

When the foggy program completion time TIME_FGP corresponding to the first page PAGE1 is reset, a foggy program completion time TIME_FGP corresponding to the second page PAGE2 may be recorded as the second foggy program completion time TIME_FGP2. That is, after a foggy program operation corresponding to the second page PAGE2 is completed, the fine program timer 210 may record the foggy program completion time TIME_FGP corresponding to the second page PAGE2.

Consequently, when the second foggy program completion response is received before the reference amount of time elapses after the first foggy program completion time TIME_FGP1 is recorded, a foggy program completion time TIME_FGP corresponding to the first and second pages PAGE1 and PAGE2 may be recorded as the second foggy program completion time TIME_FGP2.

Subsequently, the fine program timer 210 may measure an elapsing amount of time from the second foggy program completion time TIME_FGP2. When the elapsing amount of time from the second foggy program completion time TIME_FGP2 exceeds a reference amount of time, the fine program timer 210 may output dummy program instruction information, and a dummy program command instructing a dummy program operation on adjacent pages may be output to the memory device 100 such that a fine program operation is performed on the first and second pages PAGE1 and PAGE2, based on the dummy program instruction information. The fine program operation may be performed in a sequence in which the first and second pages PAGE1 and PAGE2 are foggy-programmed.

However, when the fine program timer 210 receives a third foggy program completion response before the elapsing amount of time from the second foggy program completion time TIME_FGP2 exceeds the reference amount of time, the fine program timer 210 may reset the foggy program completion time TIME_FGP. That is, when the third foggy program completion response is received, the second foggy program completion time TIME_FGP2 corresponding to the first and second pages PAGE1 and PAGE2, which was previously recorded, may be reset. The second foggy program completion time TIME_FGP2 may be reset as a third foggy program completion time TIME_FGP3 at which the third foggy program completion response is received.

When the foggy program completion time TIME_FGP corresponding to the first and second pages PAGE1 and PAGE2 is reset, a foggy program completion time TIME_FGP corresponding to the third page PAGE3 may be recorded as the third foggy program completion time TIME_FGP3. That is, after a foggy program operation corresponding to the third page PAGE3 is completed, the fine program timer 210 may record the foggy program completion time TIME_FGP corresponding to the third page PAGE3.

Consequently, when the third foggy program completion response is received before the elapsing amount of time after the first foggy program completion time TIME_FGP1 is recorded, and the second foggy program completion time TIME_FGP2 is recorded exceeds the reference amount of time, a foggy program completion time TIME_FGP corresponding to the first, second, and third pages PAGE1, PAGE2, and PAGE3 may be recorded as the third foggy program completion time TIME_FGP3.

Subsequently, the fine program timer 210 may measure an elapsing amount of time from the third foggy program completion time TIME_FGP3. When the elapsing amount of time from the third foggy program completion time TIME_FGP3 exceeds a reference amount of time, the fine program timer 210 may output dummy program instruction information, and a dummy program command instructing a dummy program operation on adjacent pages may be output to the memory device 100 such that a fine program operation is performed on the first, second, and third pages PAGE1, PAGE2, and PAGE3, based on the dummy program instruction information. The fine program operation may be performed in a sequence in which the first, second, and third pages PAGE1, PAGE2, and PAGE3 are foggy-programmed.

FIG. 12 is a diagram illustrating a foggy-fine program operation sequence when a dummy program operation is performed.

Referring to FIGS. 9 and 12, a first column shown in FIG. 12 is identical to the first column shown in FIG. 9, a second column shown in FIG. 12 illustrates a sequence of foggy program operations in the foggy-fine program operation, and a third column shown in FIG. 12 illustrates a sequence of fine program operations in the foggy-fine program operation.

In an embodiment, when the memory device 100 performs a program operation, the program operation may be sequentially performed from the first page PAGE1 to the twelfth page PAGE12. However, when the memory device 100 performs the foggy-fine program operation, the sequence of foggy program operations and fine program operations may be rearranged.

Unlike FIG. 9, FIG. 12 illustrates a case where data to be foggy-programmed is not received after a fifth foggy program operation.

In an embodiment, after a foggy program operation 1 on the first page PAGE1, a foggy program operation 2 on the second page PAGE2, a foggy program operation 3 on the third page PAGE3, a foggy program operation 4 on the fourth page PAGE4, and a foggy program operation 5 on the fifth page PAGE5 may be sequentially performed. Since an elapsing amount of time from a foggy program completion time TIME_FGP on each page does not exceed a reference amount of time, a fine program operation on the first to fifth pages PAGE1 to PAGE5 may not be performed.

In an embodiment, after the foggy program operation on the fifth page PAGE5, data to be programmed to the memory device may not be received from the host 300. That is, an elapsing amount of time from a foggy program completion time at which a foggy program completion response on the fifth page PAGE5 is received may exceed the reference amount of time. Therefore, an operation for performing the fine program operation on the first to fifth pages PAGE1 to PAGE5 may be performed.

First, in order to perform a fine program operation on the first page PAGE1, it may be determined whether a foggy program operation has been performed on pages adjacent to the first page PAGE1. That is, the fine program operation on the first page PAGE1 may be performed based on whether a foggy program operation on the second and fifth pages PAGE2 and PAGE5 adjacent to the first page PAGE1 has been performed. This is for the purpose of minimizing influence of interference between adjacent memory cells.

Referring to FIG. 12, the foggy program operation has already been performed on the second and fifth pages PAGE2 and PAGE5 adjacent to the first page PAGE1. Therefore, a fine program operation 6 on the first page PAGE1 may be performed.

In order to perform a fine program operation on the second page PAGE2 after the fine program operation on the first page PAGE1 is performed, it may be determined whether a foggy program operation has been performed on the first, third, and sixth pages PAGE1, PAGE3, and PAGE6 adjacent to the second page PAGE2. In an embodiment, since the foggy program operation has not been performed on the sixth page PAGE6, a dummy program operation 7 may be performed on the sixth page PAGE6. Subsequently, since the program operation has been performed on all the first, third, and sixth pages PAGE1, PAGE3, and PAGE6, a fine program operation 8 may be performed on the second page PAGE2.

In this manner, a fine program operation 10 may be performed on the third page PAGE3 after a dummy program operation 9 is performed on the seventh page PAGE7, a fine program operation 12 may be performed on the fourth page PAGE4 after a dummy program operation 11 is performed on the eighth page PAGE8, and a fine program operation 14 may be performed on the fifth page PAGE5 after a dummy program operation 13 is performed on the ninth page PAGE9.

After the fine program operation is performed on the fifth page PAGE5, the memory device 100 may perform a foggy program operation corresponding to a foggy program command received from the memory controller 200. Since dummy data has programmed to the sixth to ninth pages PAGE6 to PAGE9, the memory device may sequentially perform foggy programs from the tenth page PAGE10. That is, after a foggy program operation 15 on the tenth page PAGE10 is performed, a foggy program operation 16 on the eleventh page PAGE11 and a foggy program operation 17 on the twelfth page PAGE12 may be performed.

In an embodiment, after the foggy program operation on the fifth page PAGE5, the memory device 100 may receive a flush command from the memory controller 200. When the memory device 100 receives the flush command, a program operation cannot be performed on another page until before a fine program is performed on the first to fifth pages PAGE1 to PAGE5, and therefore, an operation for performing the fine program operation on the first to fifth pages PAGE1 to PAGE5 may be performed.

For example, like the case where the data to be programmed to the memory device is not received from the host 300 after the foggy program operation 5 on the fifth page PAGE5, the fine program operation 6 may be performed on the first page PAGE1. Subsequently, the fine program operation 8 may be performed on the second page PAGE2 after the dummy program operation 7 is performed on the sixth page PAGE6, the fine program operation 10 may be performed on the third page PAGE3 after the dummy program operation 9 is performed on the seventh page PAGE7, the fine program operation 12 may be performed on the fourth page PAGE4 after the dummy program operation 11 is performed on the eighth page PAGER, and the fine program operation 14 may be performed on the fifth page PAGE5 after the dummy program operation 13 is performed on the ninth page PAGE9.

In an embodiment, after the foggy program operation on the fifth page PAGE5, a power voltage may be decreased to a Power On Reset (POR) level. After the fine program operation is performed on the first to fifth pages PAGE1 to PAGE5 on which the foggy programs are performed, power may be reset.

Therefore, the fine program operation 6 may be performed on the first page PAGE1 by using the same method as when the flush command is received. Subsequently, the fine program operation 8 may be performed on the second page PAGE2 after the dummy program operation 7 is performed on the sixth page PAGE6, the fine program operation 10 may be performed on the third page PAGE3 after the dummy program operation 9 is performed on the seventh page PAGE7, the fine program operation 12 may be performed on the fourth page PAGE4 after the dummy program operation 11 is performed on the eighth page PAGE8, and the fine program operation 14 may be performed on the fifth page PAGE5 after the dummy program operation 13 is performed on the ninth page PAGE9.

FIG. 13 is a diagram illustrating a foggy-fine program operation sequence when a foggy program operation is performed after a dummy program operation is performed.

Referring to FIGS. 12 and 13, a first column shown in FIG. 13 is identical to the first column shown in FIG. 12, a second column shown in FIG. 13 illustrates a sequence of foggy program operations in the foggy-fine program operation, and a third column shown in FIG. 13 illustrates a sequence of fine program operations in the foggy-fine program operation.

In an embodiment, when the memory device 100 performs a program operation, the program operation may be sequentially performed from the first page PAGE1 to the twelfth page PAGE12. However, when the memory device performs the foggy-fine program operation, the sequence of foggy program operations and fine program operations may be rearranged.

Unlike FIG. 12, FIG. 13 illustrates a case where a foggy program completion response is received while a fine program operation is being performed.

In an embodiment, after a foggy program operation 1 on the first page PAGE1, a foggy program operation 2 on the second page PAGE2, a foggy program operation 3 on the third page PAGE3, a foggy program operation 4 on the fourth page PAGE4, and a foggy program operation 5 on the fifth page PAGE5 may be sequentially performed.

Subsequently, when an elapsing amount of time from a foggy program completion time at which a foggy program completion response to the fifth page PAGE5 is received exceeds a reference amount of time, a fine program operation 6 may be performed on the first page PAGE1. That is, since the foggy program operation has been performed on the second and fifth pages PAGE2 and PAGE5 adjacent to the first page PAGE1, the fine program operation may be performed on the first page PAGE1.

When the fine program operation 6 is performed on the first page PAGE1, a fine program operation 8 may be performed on the second page PAGE2 after a dummy program operation 7 is performed on the sixth page PAGE6, and a fine program operation 10 may be performed on the third page PAGE3 after a dummy program operation 9 is performed on the seventh page PAGE7.

However, after the fine program operation 10 on the third page PAGE3 is performed, a foggy program operation 11 may be performed on the eighth page PAGE8. Therefore, when a foggy program completion response is received after the foggy program operation 11 is performed on the eighth page PAGE8, a foggy program completion time TIME_FGP corresponding to the fifth page PAGE5 may be reset. That is, the foggy program completion time TIME_FGP may be reset as an eighth foggy program completion time at which a foggy program completion response corresponding to the eighth page PAGE8 is received. A foggy program completion time TIME_FGP corresponding to the eighth page PAGE8 may also be the eighth foggy program completion time.

Subsequently, when an elapsing amount of time from the eighth foggy program completion time exceeds the reference amount of time, the fine program timer 210 may output dummy program instruction information, and the command controller 220 may output a fine program command, based on the dummy program instruction information. Before the fine program command is output, a dummy program command may be output based on a position of a page on which a fine program is performed, i.e., whether the page is influenced by interference between memory cells.

For example, since the foggy program operation has been performed on both the third and eighth pages PAGE3 and PAGE8 that are pages adjacent to the fourth page PAGE4 on which a fine program is to be performed, a fine program operation 12 may be performed on the fourth page PAGE4, without outputting the dummy program command.

However, since a foggy program operation has not been performed on the ninth page PAGE9 among the pages adjacent to the fifth page PAGE5, a fine program operation 14 may be performed on the fifth page PAGE5 after a dummy program operation 13 is performed on the ninth page PAGE9. In addition, since a foggy program operation has not been performed on the twelfth page PAGE12 among the pages adjacent to the eighth page PAGE8, a fine program operation 18 may be performed on the eighth page PAGE8 after dummy program operation 15, 16, and 17 are performed on the tenth to twelfth pages PAGE10 to PAGE12.

FIG. 14 is a diagram illustrating a foggy-fine program operation sequence when the dummy program operation is not performed.

Referring to FIGS. 12 and 14, a first column shown in FIG. 14 is identical to the first column shown in FIG. 12, a second column shown in FIG. 14 illustrates a sequence of foggy program operations in the foggy-fine program operation, and a third column shown in FIG. 14 illustrates a sequence of fine program operations in the foggy-fine program operation.

In an embodiment, when the memory device 100 performs a program operation, the program operation may be sequentially performed from the first page PAGE1 to the twelfth page PAGE12. However, when it is determined that a program operation on specific pages has already been performed or have not been performed, the sequence of foggy program operations and fine program operations may be rearranged.

Unlike FIG. 12, in FIG. 14, a case where a program operation is not performed on the fifth to eighth pages PAGE5 to PAGE8 is assumed.

In an embodiment, after a foggy program operation 1 on the first page PAGE1, a foggy program operation 2 on the second page PAGE2, a foggy program operation 3 on the third page PAGE3, and a foggy program operation 4 on the fourth page PAGE4 may be sequentially performed.

However, since the case where the program operation is not performed on the fifth to eighth pages PAGE5 to PAGE8 has been assumed, the first page PAGE1 is not influenced by interference from the fifth page PAGE5, when a fine program operation on the first page PAGE1 is performed. In addition, the second to fourth pages PAGE2 to PAGE4 are not influenced by interference from the sixth to eighth pages PAGE6 to PAGE8 adjacent to the second to fourth pages PAGE2 to PAGE4, when a fine program operation on the second to fourth pages PAGE2 to PAGE4 is performed.

Therefore, when an elapsing amount of time from a foggy program completion time at which a fourth foggy program completion response is received exceeds a reference amount of time, a fine program operation 5 on the first page PAGE1, a fine program operation 6 on the second page PAGE2, a fine program operation 7 on the third page PAGE3, and a fine program operation 8 on the fourth page PAGE4 may be sequentially performed.

Subsequently, a foggy program operation 9 on the ninth page PAGE9, a foggy program operation 10 on the tenth page PAGE10, and a foggy program operation 11 on the eleventh page PAGE11 may be sequentially performed. Since the ninth to eleventh pages PAGE9 to PAGE 11 are not influenced by interference from neighboring pages thereof, a fine program operation 12 on the ninth page PAGE9, a fine program operation 13 on the tenth page PAGE10, and a fine program operation 14 on the eleventh page PAGE11 may be sequentially performed.

Figure 15:
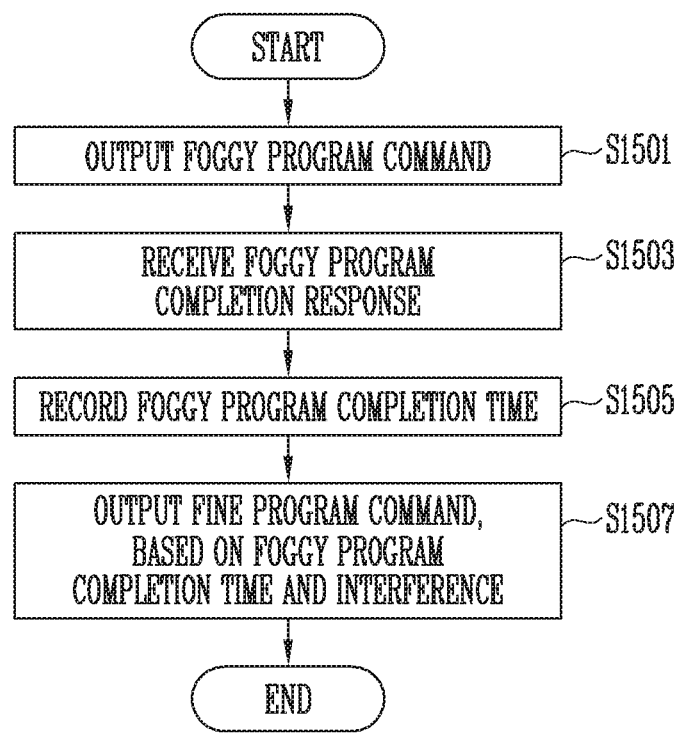
FIG. 15 is a diagram illustrating an operation of the memory controller in accordance with an embodiment of the present disclosure.

FIG. 15 is a diagram illustrating an operation of the memory controller in accordance with an embodiment of the present disclosure.

Referring to FIG. 15, in step S1501, the memory controller may output a foggy program command to the memory device. The foggy program command may be one of commands corresponding to a foggy-fine program request from the host. The memory device may perform a foggy program operation corresponding to the foggy program command by receiving the foggy program command. By the foggy program operation, memory cells of an erase state may be programmed to any one state among program states which are not subdivided.

After the memory device completes the program operation, the memory controller may receive, from the memory device, a foggy program completion response representing that the foggy program operation has been completed (S1503). The memory controller may record a foggy program completion time by receiving the foggy program completion response (S1505). The foggy program completion time may be a time at which the foggy program completion response is received from the memory device.

Subsequently, the memory controller may output a fine program command, based on the foggy program completion time and interference (S1507). The fine program command may be one of commands corresponding to the foggy-fine program request from the host.

In an embodiment, the memory controller may output the fine program command, when an elapsing amount of time from the foggy program completion time exceeds a reference amount of time. However, the memory controller may output a dummy program command instructing a dummy program operation according to whether a foggy program operation has been performed on pages adjacent to a page on which a fine program operation is performed, before the memory controller outputs the fine program command.

Figure 16:
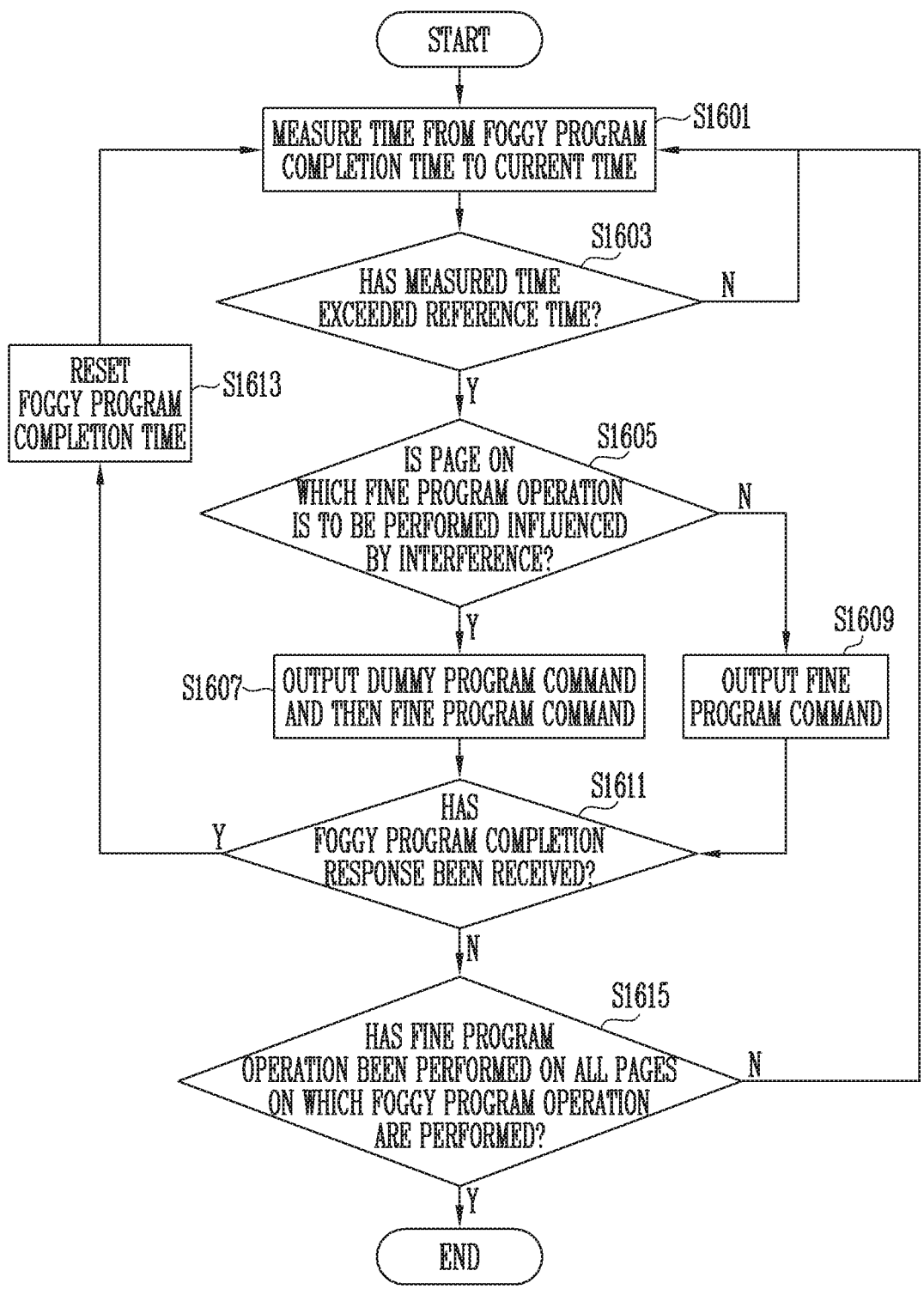
FIG. 16 is a diagram illustrating an operation of the memory controller in accordance with an embodiment of the present disclosure.

FIG. 16 is a diagram illustrating an operation of the memory controller in accordance with an embodiment of the present disclosure.

Referring to FIG. 16, steps S1601 to S1615 correspond to steps obtained by subdividing the step S1507.

In step S1601, the memory controller may measure a time from a foggy program completion time to a current time. That is, the memory controller may measure an elapsing amount of time from the foggy program completion time.

The memory controller may measure the elapsing amount of time from the foggy program completion time, and determine whether the measured time has exceeded a reference amount of time (S1603). The reference amount of time may be predetermined.

In an embodiment, when the measured time does not exceed the reference amount of time (N), the memory controller may measure an elapsing amount of time from the foggy program completion time by proceeding to the step S1601.

However, when the measured time exceeds the reference amount of time (Y), the memory controller may determine whether a page on which a fine program operation is to be performed is influenced by interference (S1605).

When the page on which the fine program operation is to be performed is influenced by the interference (Y), the memory controller may output a dummy program command for dummy-programming pages adjacent to pages on which a fine program is performed and then output a fine program command (S1607).

On the contrary, when the page on which the fine program operation is to be performed is not influenced by the interference (N), the memory controller may output the fine program command without outputting the dummy program command (S1609).

Subsequently, in step S1611, the memory controller may determine whether a foggy program completion response has been received from the memory device.

When the memory controller receives the foggy program completion response (Y), the memory controller may reset a foggy program completion time (S1613). The reset foggy program completion time may be a time at which a foggy program completion response is newly received.

However, when the memory controller does not receive the foggy program completion response (N), the memory controller may determine whether a fine program operation has been performed on all pages on which a foggy program operation is performed (S1615). When the fine program operation is not performed on all the pages on which the foggy program operation is performed (N), the memory controller may measure an elapsing amount of time from the foggy program completion time by proceeding to the step S1601.

Figure 17:
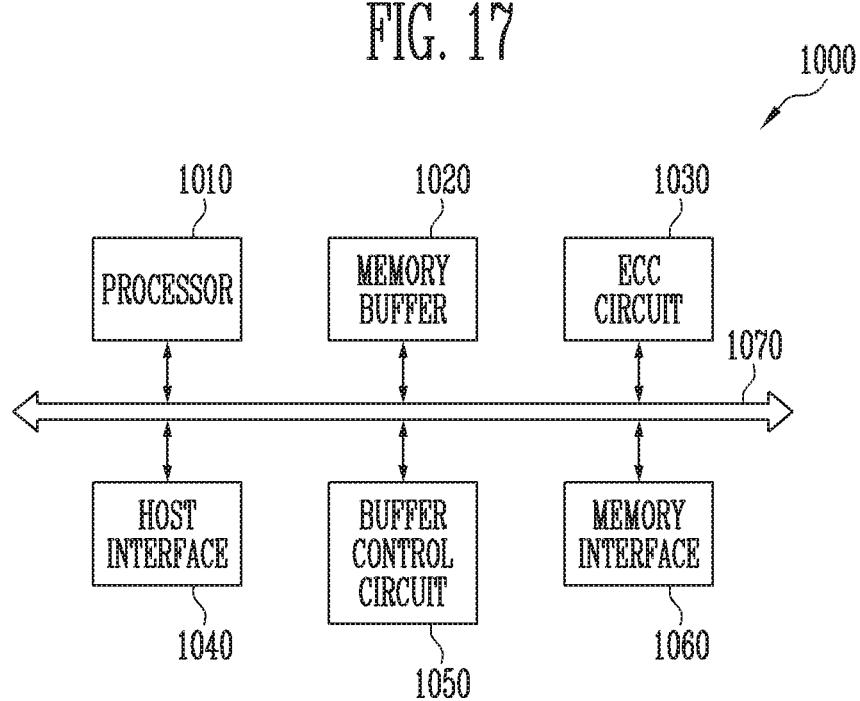
FIG. 17 is a diagram illustrating another embodiment of the memory controller shown in FIG. 1.

FIG. 17 is a diagram illustrating another embodiment of the memory controller shown in FIG. 1.

Referring to FIG. 17, a memory controller 1000 is connected to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

The processor 1010 may perform randomizing and derandomizing by driving software or firmware.

In an embodiment, the processor 1010 may record a foggy program completion time by receiving a foggy program completion response corresponding to a foggy program command from the memory device 100, and output a fine program command to the memory device 100 according to whether an elapsing amount of time from the foggy program completion time has exceeded a reference amount of time.

Before the processor 1010 outputs the fine program command, the processor 1010 may output a dummy program command to the memory device 100 according to whether a page on which a fine program operation is performed is influenced by interference.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 18:
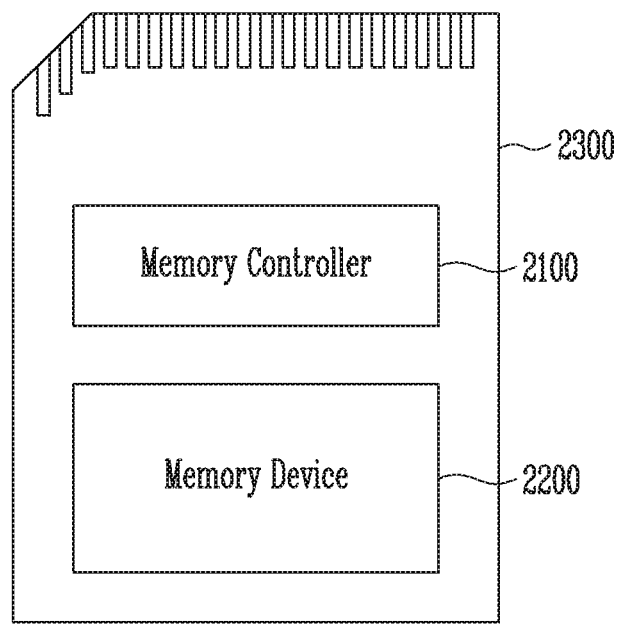
FIG. 18 is a block diagram exemplarily illustrating a memory card system to which the storage device is applied in accordance with an embodiment of the present disclosure.

FIG. 18 is a block diagram exemplarily illustrating a memory card system to which the storage device is applied in accordance with an embodiment of the present disclosure.

Referring to FIG. 18, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be implemented identically to the memory device 100 described with reference to FIG. 2.

In an embodiment, the memory controller 2100 may record a foggy program completion time by receiving a foggy program completion response corresponding to a foggy program command from the memory device 2200, and output a fine program command to the memory device 2200 according to whether an elapsing amount of time from the foggy program completion time has exceeded a reference amount of time.

Before the memory controller 2100 outputs the fine program command, the memory controller 2100 may output a dummy program command to the memory device 2200 according to whether a page on which a fine program operation is performed is influenced by interference.

In an example, the memory controller 2100 may include components such as a Random Access Memory (RAM), a processing unit, a host interface, a memory interface, and an error corrector.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

In an example, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 19:
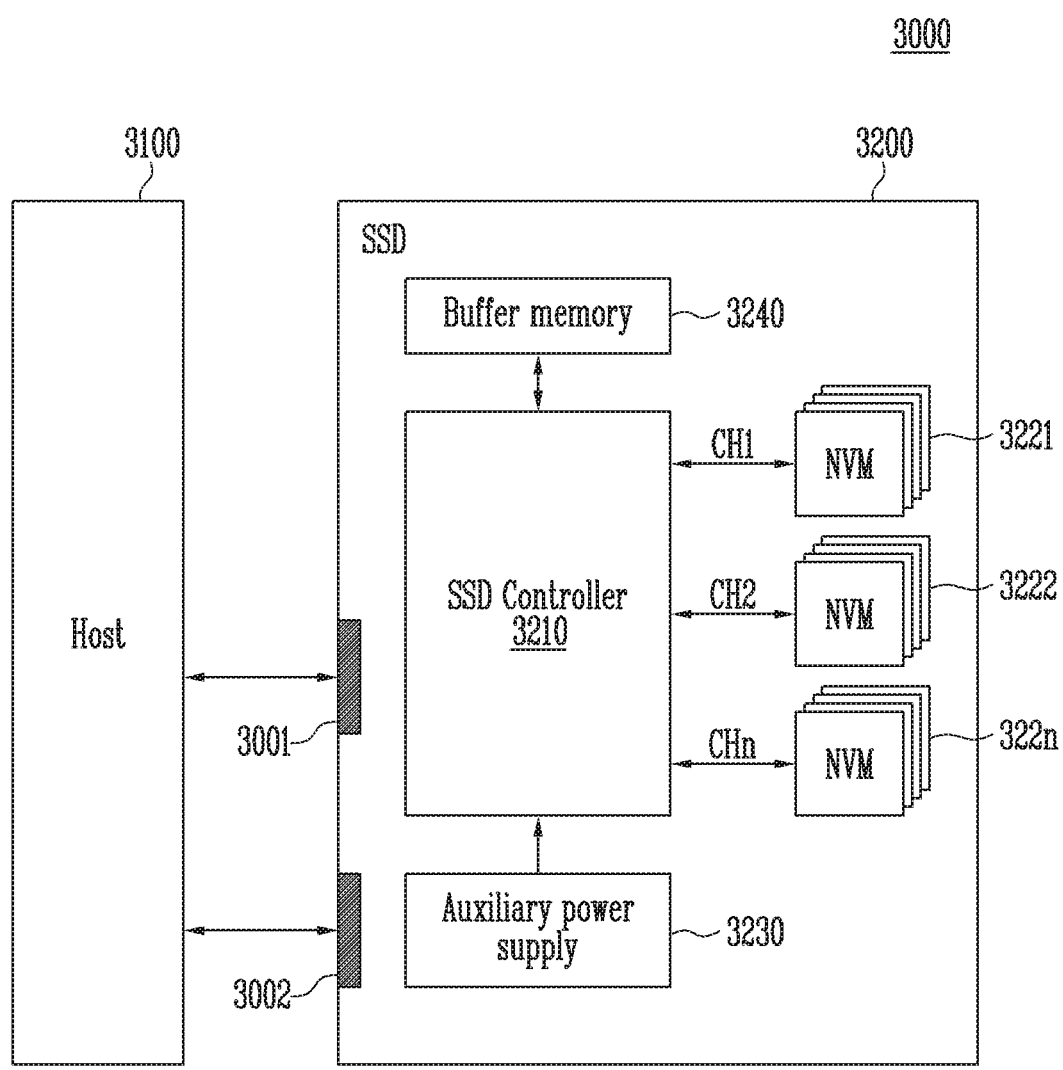
FIG. 19 is a block diagram exemplarily illustrating a Solid State Drive (SSD) system to which the storage device is applied in accordance with an embodiment of the present disclosure.

FIG. 19 is a block diagram exemplarily illustrating a Solid State Drive (SSD) system to which the storage device is applied in accordance with an embodiment of the present disclosure.

Referring to FIG. 19, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

In an embodiment, the SSD controller 3210 may record a foggy program completion time by receiving a foggy program completion response corresponding to a foggy program command from the plurality of flash memories 3221 to 322n, and output a fine program command to the plurality of flash memories 3221 to 322n according to whether an elapsing amount of time from the foggy program completion time has exceeded a reference amount of time.

Before the SSD controller 3210 outputs the fine program command, the SSD controller 3210 may output a dummy program command to the plurality of flash memories 3221 to 322n according to whether a page on which a fine program operation is performed is influenced by interference.

The auxiliary power supply 3230 is connected to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 20:
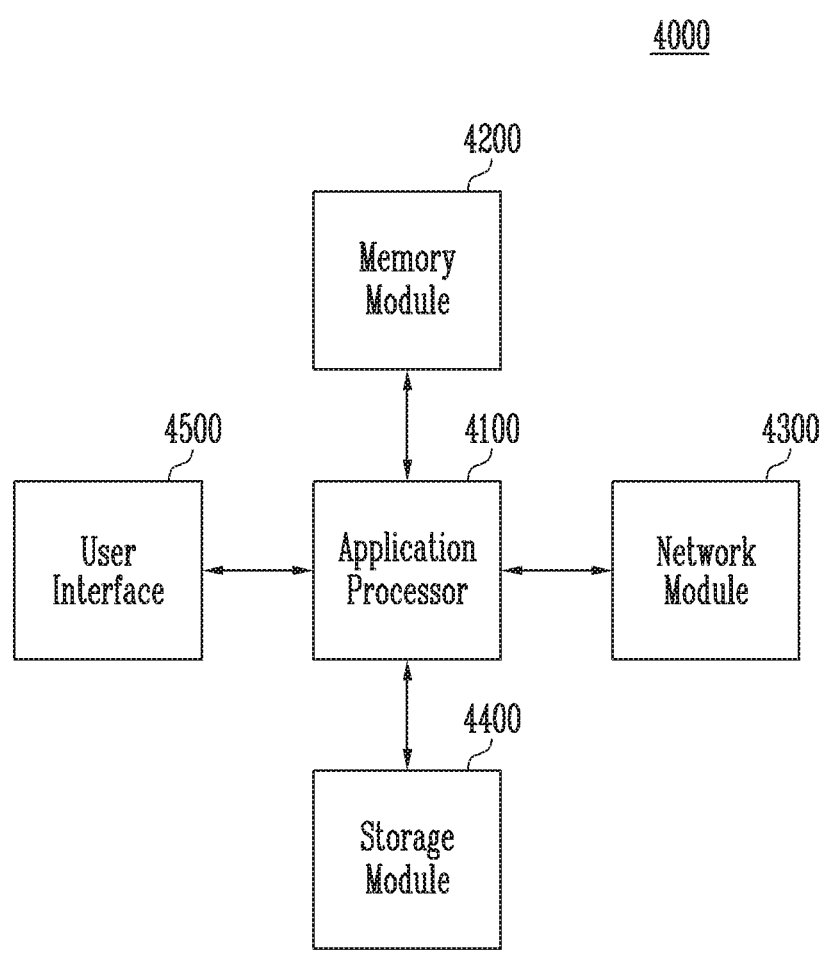
FIG. 20 is a block diagram exemplarily illustrating a user system to which the storage device is applied in accordance with an embodiment of the present disclosure.

FIG. 20 is a block diagram exemplarily illustrating a user system to which the storage device is applied in accordance with an embodiment of the present disclosure.

Referring to FIG. 20, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

In an embodiment, the application processor 4100 may record a foggy program completion time by receiving a foggy program completion response corresponding to a foggy program command from the storage module 4400, and output a fine program command to the storage module 4400 according to whether an elapsing amount of time from the foggy program completion time has exceeded a reference amount of time.

Before the application processor 4100 outputs the fine program command, the application processor 4100 may output a dummy program command to the storage module 4400 according to whether a page on which a fine program operation is performed is influenced by interference.

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices, and the plurality of nonvolatile memory devices may operate identically to the memory device described with reference to FIG. 2. The storage module 4400 may operate identically to the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, when a reference amount of time elapses after foggy program completion, a foggy program completion time can be recorded such that a fine program operation is performed. In addition, when a page on which a fine program operation is performed is influenced by interference, the fine program operation can be performed after a dummy program operation.

What is claimed is:

1. A memory controller for controlling a memory device to perform a foggy-fine program operation on a plurality of pages, the memory controller comprising:
a fine program timer configured to record a foggy program completion time at which a foggy program completion response corresponding to a foggy program operation is received from the memory device, and output a dummy program instruction for pages, among the plurality of pages, adjacent to a page on which a fine program operation is to be performed after the foggy program operation is performed, after an elapsed amount of time from the foggy program completion time has expired; and
a command controller configured to:
determine dummy-programming pages on which dummy program operations are performed, among the pages, based on program operations performed on the pages; and
output a dummy program command for dummy-programming the pages and a fine program command corresponding to the fine program operation based on the dummy program instruction.

2. The memory controller of claim 1, wherein the command controller outputs, when the pages adjacent to the page on which the fine program operation is to be performed among the plurality of pages are not yet programmed, the dummy program command for dummy-programming the adjacent pages before outputting the fine program command.

3. The memory controller of claim 2, wherein the command controller outputs the dummy program command until the adjacent pages are all programmed.

4. The memory controller of claim 1, wherein the fine program timer outputs the dummy program instruction when the elapsed amount of time exceeds a reference amount of time.

5. The memory controller of claim 1, wherein the fine program command instructs a fine program operation on a page on which a foggy program operation is completed among the plurality of pages.

6. The memory controller of claim 5, wherein the command controller outputs, based on whether a program operation has been performed on pages adjacent to a page on which a foggy program operation is completed among the plurality of pages, the dummy program command for dummy-programming the pages adjacent to the page on which a foggy program operation is completed.

7. The memory controller of claim 1, wherein the fine program timer resets the foggy program completion time when a new foggy program completion response is received from the memory device before the elapsed amount of time exceeds a reference amount of time.

8. The memory controller of claim 7, wherein the foggy program completion time is reset to a time point at which the new foggy program completion response is received, and
wherein the fine program timer determines whether the elapsed amount of time from the reset foggy program completion time exceeds the reference amount of time.

9. The memory controller of claim 1, wherein, when a flush request is received before the elapsed amount of time exceeds a reference amount of time, the command controller outputs a fine program command instructing a fine program operation on pages on which the foggy program operation is performed.

10. The memory controller of claim 9, wherein the command controller outputs, when the pages adjacent to the page on which the fine program operation is to be performed are not yet programmed, the dummy program command for dummy-programming the adjacent pages before outputting the fine program command.

11. The memory controller of claim 1, wherein the command controller outputs, when a power voltage level is equal to or smaller than a reference level before the elapsed amount of time exceeds a reference amount of time, a fine program command instructing a fine program operation on pages on which the foggy program operation is performed.

12. A method for operating a memory controller for controlling a memory device to perform a foggy-fine program operation on a plurality of pages, the method comprising:
recording a foggy program completion time at which a foggy program completion response corresponding to a foggy program operation is received from the memory device;
outputting a dummy program instruction for pages, among the plurality of pages, adjacent to a page on which a fine program operation is to be performed after the foggy program operation is performed, after an elapsed amount of time from the foggy program completion time has expired;
determining dummy-programming pages on which dummy program operations are performed, among the pages, based on program operations performed on the pages; and
outputting a dummy program command for dummy-programming the pages and a fine program command corresponding to the fine program operation based on the dummy program instruction.

13. The method of claim 12, further comprising outputting, when the pages adjacent to the page on which the fine program operation is to be performed among the plurality of pages are not yet programmed, the dummy program command for dummy-programming the adjacent pages before the outputting of the fine program command.

14. The method of claim 12, wherein the dummy program instruction is output when the elapsed amount of time exceeds a reference amount of time.

15. The method of claim 12, wherein the fine program command instructs a fine program operation on a page on which a foggy program operation is completed among the plurality of pages is output.

16. The method of claim 15, further comprising outputting, based on whether a program operation has been performed on pages adjacent to a page on which a foggy program operation is completed among the plurality of pages, the dummy program command for dummy-programming the pages adjacent to a page on which a foggy program operation is relatively lately completed.

17. The method of claim 12, wherein the recording includes resetting the foggy program completion time when a new foggy program completion response is received from the memory device before the elapsed amount of time exceeds a reference amount of time.

18. The method of claim 17, wherein the foggy program completion time is reset to a time point at which the new foggy program completion response is received.

19. The method of claim 18, wherein the dummy program instruction is output according to whether the elapsed amount of time from the reset foggy program completion time exceeds the reference amount of time.

20. An operating method of a controller for controlling a memory device, the operating method comprising:

controlling the memory device to perform one or more foggy program operations respectively on one or more erased pages included therein;

controlling the memory device to perform one or more fine program operations respectively on one or more foggy-programmed pages each having neighboring pages substantially free of interference; and controlling the memory device to perform one or more dummy program operations respectively on one or more erased pages neighboring the foggy-programmed pages while a completion response on one among the foggy program operations is not provided from the memory device over a threshold amount of time, wherein the dummy program operations are to be performed based on program operations performed on the one or more erased pages neighboring the foggy-programmed pages, and wherein the fine program operations are to be performed on the one or more erased pages after the dummy program operations and the foggy program operations are performed.

* * * * *